United States Patent [19]
LeCourt

[11] Patent Number: 5,936,495
[45] Date of Patent: Aug. 10, 1999

[54] FUSE SWITCH

[75] Inventor: William N. LeCourt, Milwaukee, Wis.

[73] Assignee: Miklinjul Corporation, Milwaukee, Wis.

[21] Appl. No.: 08/969,807

[22] Filed: Nov. 13, 1997

Related U.S. Application Data

[60] Division of application No. 08/389,586, Feb. 16, 1995, Pat. No. 5,734,207, which is a continuation-in-part of application No. 08/239,030, May 6, 1994, abandoned.

[51] Int. Cl.⁶ .................................................. H01H 75/00
[52] U.S. Cl. ................................. 335/6; 337/35; 335/172
[58] Field of Search ................................ 335/61, 167–76, 335/185–195; 337/35–38

[56] References Cited

U.S. PATENT DOCUMENTS

| | | |
|---|---|---|
| Re. 34,396 | 10/1993 | Wollenhaupt . |
| 3,665,246 | 5/1972 | Kurahashi et al. . |
| 3,703,680 | 11/1972 | Frank et al. . |
| 4,103,316 | 7/1978 | Kaneko . |
| 4,162,442 | 7/1979 | Frank . |
| 4,203,083 | 5/1980 | Opfer et al. . |
| 4,428,022 | 1/1984 | Engel et al. . |
| 4,768,007 | 8/1988 | Mertz et al. . |
| 4,977,513 | 12/1990 | LaPalme . |
| 4,996,646 | 2/1991 | Farrington . |
| 5,089,797 | 2/1992 | Grunert et al. . |
| 5,270,913 | 12/1993 | Limpaecher . |
| 5,331,234 | 7/1994 | Merritt et al. . |
| 5,337,214 | 8/1994 | Lindsey et al. . |
| 5,361,184 | 11/1994 | Bonneau et al. . |
| 5,386,147 | 1/1995 | Bonneau et al. . |
| 5,400,171 | 3/1995 | Song . |
| 5,422,779 | 6/1995 | Borkowicz . |
| 5,428,495 | 6/1995 | Murphy et al. . |
| 5,429,953 | 7/1995 | Byatt . |
| 5,473,533 | 12/1995 | Mengelt . |

FOREIGN PATENT DOCUMENTS

| | | |
|---|---|---|
| 0 226 395 | 6/1986 | European Pat. Off. . |
| 54-111289 | of 1979 | Japan . |
| 6-162880 | of 1994 | Japan . |
| 6-181431 | of 1994 | Japan . |

OTHER PUBLICATIONS

"The Application of Photoconductive Switches in HVDC Circuit Interruption", O.A. Ciniglio and D.P. Carroll, IEEE Power Engineering Review, Jan., 1990.

"Field Evaluation and Industry's First–Self Protected, Light– Triggered Thryistor", F. Cibulka, L. Crane and J. Marks, IEEE Power Engineering Review, Jan. 1990.

"Utility Power Quality Controls —A New Market for Power Electronics", J. Douglas, PCIM, Oct. 1989.

"A Better Way to Protect Solid State Starters", Tom Caputo, Machine Design, Sep. 12, 1991.

"Bigger Roll for Solid State Relays", John R. Gyorki, Machine Designs Mar. 9, 1989.

(List continued on next page.)

*Primary Examiner*—Lincoln Donovan
*Attorney, Agent, or Firm*—Michael Best & Friedrich LLP

[57] ABSTRACT

An apparatus for use in a power distribution system including an assembly with a support having an electrically conductive portion and an arm pivotally mounted to the first support for movement between a closed position and an open position. The arm has a conductive portion which is adapted to be electrically connected to one of a power source and a load and which is spaced from the conductive portion of the support both when the arm is in its closed position and when the arm is in its open position. The assembly further includes a spring biasing the arm to its open position, and a fuse electrically connected between the conductive portion of the arm and the conductive portion of the support. The fuse retains the arm in its closed position against the bias of the spring. When current flow causes the fuse to blow, the spring biases the arm to its open position thereby providing a visual indication that there is no current path from the source to the load.

9 Claims, 12 Drawing Sheets

CLOSED OPERATING POSITION

OTHER PUBLICATIONS

"Coordinating Protective–Device Settings Can Result in Large Dollar Savings", S. Edward Franklin, Westinghouse Engineer, Sep. 1971.

"SCR Contactor Simplifies Solid State Conversion", E.J. Stefanides, Design News, Mar. 13, 1989.

"Development of VBO–Free Large Capacity Light–Triggered Thyristor Valve", S. Horiuchi, T. Horiuchi and Y. Muraoka, IEEE Power Engineering Review, Jan, 1992.

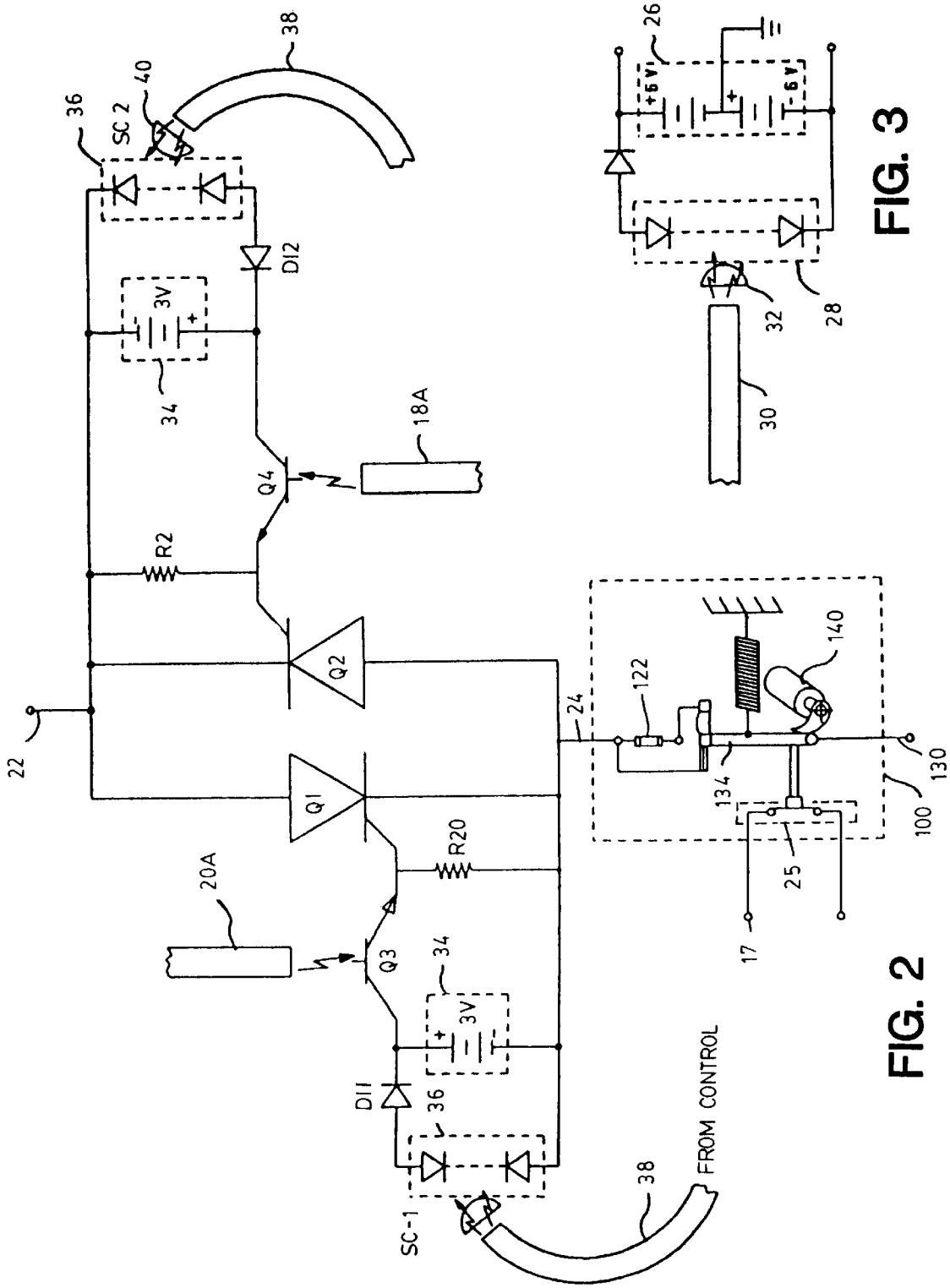

FIG. 7 : CLOSED OPERATING POSITION

FIG. 8: INTERMEDIATE OPERATING POSITION

FIG. 9 : OPEN OPERATING POSITION

FIG. 10: FAULT INDICATING POSITION

FUSE SWITCH

RELATED APPLICATIONS

This application is a divisional patent application of U.S. patent application Ser. No. 08/389,586, filed Feb. 16, 1995, now issued as U.S. Pat. No. 5,734,207, which is a continuation-in-part patent application of U.S. patent application Ser. No. 08/239,030 titled "VOLTAGE POLARITY MEMORY SYSTEM AND FUSE-SWITCH ASSEMBLY USABLE THEREWITH" filed May 6, 1994, now abandoned.

FIELD OF THE INVENTION

The invention relates generally to AC power distribution systems and, more particularly, to systems for eliminating the generation of damaging levels of magnetizing inrush current upon closing of switchgear.

BACKGROUND OF THE INVENTION

Prior art systems for controlling electricity in power distribution systems employ fuses, switches, sectionalizers, or automatic circuit reclosers to remove faulted portions of the distribution system so that non-faulted portions of the system can continue to provide electrical power to users who are not on the faulted portions of the system. The term "switchgear", as used herein, is to be interpreted to encompass fuses, switches, sectionalizers, breakers, and automatic circuit reclosers.

There are various problems associated with mechanical switchgear which will be discussed below.

In the field of electrical distribution systems, certain terms, mentioned above, are used that are commonly understood as set forth below.

A fuse is a protective device that basically includes a piece of wire that overheats and separates into two pieces when current through it exceeds a predetermined value. The time required for separation is inversely proportional to the magnitude of current passing through the fuse. That is, the larger the value of current, the faster the wire will separate.

A switch includes a moveable piece of conductive metal that is movable between a closed position for providing a current path through the switch, and an open position for preventing current from flowing through the switch. Switches are used to control loads which, in a distribution circuit, almost always comprises a transformer.

A sectionalizer is an automatic switch that has control circuitry, and separable contacts that are normally closed, but that open when the control circuitry determines that switchgear on the source side of the sectionalizer (i.e., up-line of the sectionalizer) has opened and closed a predetermined number of times. The sectionalizer always opens its contacts when the source side (up-line) device has its contacts open and, thus, no electricity is flowing. This allows the use of low cost, non-interrupting contacts in sectionalizers.

A recloser is an automatic device that has separable contacts and control means for measuring current flow through the recloser when the contacts are closed. If current is excessive, the control means causes the contacts to open. After a period of time which is determined based on avoiding overheating, the control means closes the contacts, e.g. by energizing a motor or a large solenoid. This open-close sequence can occur for up to a predetermined number of times in a given period before the control means prevents the contacts from reclosing. This condition where reclosing is prevented is referred to as "lockout".

Reclosers, as presently manufactured, have the ability to interrupt large values of fault currents, such as would be produced by two or more electrical lines shorting together or falling to ground. To provide this ability, the reclosers include specially designed electrical contacts made of special material so as to provide long life.

The different types of electrical contacts used in switchgear are usually referred to based on the type of insulating material used to prevent electrical flow when the contacts are open. The most common insulating materials include oil, vacuum, or $SF_6$.

Where oil is used, an ionized gas is formed during arcing that occurs when the contacts are separated. The gas is exploded by the arcing of the hot electrical current and the explosion blows out the arc, in specially designed chambers, and deionizes the gas.

Where a vacuum is used, the contacts are enclosed in a vacuum by glass or porcelain. One of the contacts is moveable, and when moved to an open position, the vacuum atmosphere has no molecules to be ionized. Therefore, the electrical current is terminated at the first zero crossing point of the current sinusoid that occurs after the contacts have separated.

Where $SF_6$ is used, $SF_6$, which is an inert gas, is blown between contacts as they separate and while arcing occurs, until the first zero crossing point of current. Alternatively, the arc is rotated and the $SF_6$ cools off the arc as it rotates, preventing arcing from reoccurring after the first zero crossing point of the current sinusoid.

The contacts in switchgear wear by a varying degree depending on the type of insulating material used, and depending on where in a current half-cycle the contacts separate. If the contacts separate late in the half-cycle, there is a relatively small amount of Volt-Ampere product that is to be dissipated as power and that causes erosion of the contact material. If the contacts separate early in the half-cycle, the Volt-Ampere product can be very large, and significant erosion of the contact material can take place. This is especially a problem in oil interrupters where contact erosion is a major problem anyway.

The contacts in switchgear also have problems associated with "restrike", wherein instead of an opening contact holding the current off after a zero crossing point of the current sinusoid, the contacts separate too slowly and high voltage applied to the contacts in a new half cycle cause the contact gap to be ionized and break down and carry current for the remainder of that half cycle.

A problem associated with vacuum contacts is that, at low voltages, the current stops or "chops" before getting to a zero crossing, causing stress to the electrical distribution system which has to dissipate the energy stored in the system reactances. These energies would otherwise be dissipated at the zero crossing point of current for a proper contact opening.

Another problem with mechanical switchgear is that a long period of time is required to open mechanical contacts. This opening time is on the order of one and one half cycles, from the time an opening signal is sent until the contacts actually separate, for vacuum and $SF_6$ devices to two and a half cycles for oil devices. This time causes coordination problems when fuses used with the switchgear melt within one cycle.

A problem affecting an electrical distribution system that is protected by oil, vacuum, or $SF_6$ protective devices is that when the contacts are closed to re-energize the distribution circuit, the time when the contacts are closed is random, with regard to the voltage sinusoid, and causes a phenomenon known as "magnetizing inrush current". Magnetizing inrush current occurs because when a portion of the distribution line has voltage removed, the transformers on that portion of the line are left with remnant magnetism on their cores. Magnetizing inrush current results in severe stress and perhaps damage to the equipment in the electrical distribution system. The degree to which the inrush current is a problem is directly related to the timing for disconnecting a load from and reconnecting the load to a power distribution system.

In view of the foregoing, there are many problems with using mechanical switchgear as overload protection means in a power distribution system. Therefore, it is desirable to use means other than mechanical switchgear as overload protection or for ordinary switching applications in a power distribution system. Solid state switches such as thyristors, bipolar transistors, and mosfets can be used instead of mechanical switchgear for overload protection and for directing the flow of power. See, for example, the following magazine articles: *The Application of Photoconductive Switches in HVDC Circuit Interruption*, by O. A. Ciniglio and D. P. Carroll, IEEE Power Engineering Review, January 1990; *Field Evaluation of Industry's First Self-Protected, Light-Triggered Thyristor*, by F. Cibulka, L. Crane, and J. Marks, IEEE Power Engineering Review, January 1990; *Utility Power Quality Controls—A New Market for Power Electronics*, by J. Douglas, PCIM, October 1989; and *A Better Way to Protect Solid State Starters*, by Tom Caputo, Machine Design, Sep. 12, 1991, all of which are incorporated herein by reference.

When completing a connection of a load to a power source in a power distribution system, it is desirable to connect at a zero crossing point of the sinusoid of the power source so as to avoid arcing or a condition which would cause the overload protection means to reopen, and to avoid introducing undesirable system transient conditions.

U.S. Pat. No. 3,703,680, issued to Frank et al. on Nov. 21, 1972, discloses a capacitor bank for use in a network where oscillations occur in reactive power. Anti-parallel thyristor branches are employed such that the thyristors are connected in one direction or the other in synchronism with the maximum network voltage. Connection and disconnection of the bank take place at zero crossing points of the network current. (see col. 3, lines 28–33).

U.S. Pat. No. 4,162,442, issued to Frank on Jul. 24, 1979, discloses a capacitor bank for voltage control connectable to an AC network through a bi-directional switch. After disconnection from the network, the capacitor bank is periodically made conducting to keep it charged with a voltage of constant polarity.

The circuits disclosed in each of these Frank patents are designed based on the assumption that system voltage will always be present. Neither of these patents address a situation where system voltage is interrupted. Further, neither of these patents address a situation where voltage is severely depressed.

One problem associated with using solid state switchgear, e.g. including anti-parallel thyristors or SCRs, is the problem of leakage currents flowing through the solid state switchgear device even when it is turned off. The problem of leakage currents is aggravated by a temperature rise that occurs when the thyristor has conducted a high value of current. For this reason, solid state switchgear has not been heretofore used as fault protection in a power distribution system.

SUMMARY OF THE INVENTION

The invention provides a voltage polarity or slope memory circuit for preventing magnetizing inrush currents when closing or energizing a power circuit to any type of transformer powered by either single phase or three phase power distribution networks; e.g., when reclosing overcurrent protection means in an AC power distribution system, when energizing a motor, or when turning on anti-parallel thyristors into an inductive load (or other solid state switching means used to control the flow of power in an AC power distribution system). Inrush currents have been known to cause a circuit breaker to trip immediately after it is reconnected in a power circuit.

The invention provides means for memorizing the predominant polarity of the last half-cycle of voltage and reconnecting at a zero crossing point of the voltage sinusoid for proper polarity (so that the voltage sinusoid continues cycling in the direction it would have if there had not been an interruption).

One aspect of the invention provides solid state switchgear controlling connection of a load to a power distribution system; and means for monitoring the polarity of power distribution system voltage and for storing in memory the polarity of each half cycle as long as current is flowing through the solid state switchgear. When current ceases to flow from the power distribution system to the load, the predominant polarity of the last half-cycle of system voltage remains in memory. Current is allowed to start flowing from the power distribution system to the load only at a zero crossing point of the system voltage when system voltage is of the opposite polarity of that stored in memory (so that the sinusoid continues cycling in the direction it would have if there had not been an interruption).

In a preferred embodiment of the invention, the solid state switchgear employed comprises anti-parallel thyristors or SCRs or transistors.

Another aspect of the invention provides a synchronous switch (that closes at a phase angle that can be specified) controlling connection of a load to a power distribution system; and means for monitoring and storing in memory the phase angle of power distribution system voltage at the point when current ceases. The synchronous switch is controlled such that current is only allowed to start flowing from the system source to the load at the same phase angle of the system voltage as stored in memory at the time current was allowed to cease.

Another aspect of the invention provides a synchronous switch (that closes at a phase angle that can be specified) controlling connection of a load to a power distribution system; and means for monitoring the phase angle of power distribution system voltage and for storing in memory the predominant polarity of each half cycle as long as current is flowing through the synchronous switch. When current ceases to flow through the synchronous switch, the phase angle to the last zero crossing of the system voltage prior to the moment when the current ceased to flow remains in memory. This phase angle is used to determine the slope of the voltage wave, or direction of voltage, in order to select the proper voltage zero crossing at which to reenergize the thyristors. The synchronous switch is controlled such that current is only allowed to start flowing from the system to the load at a zero crossing point when the polarity of the slope of the voltage is the same as the polarity of the slope determined from the phase angle stored in memory.

Another embodiment of the invention continually senses the 90 degree displaced or phase shifted voltage in order to indicate the polarity of the slope of the voltage waveform when the current is stopped, or when the voltage is interrupted. This slope polarity is then stored in memory to be used in determining the zero crossing of voltage at which the thyristors will be reenergized.

This embodiment provides a solution to the problem of a possible condition of a fault that severely depresses system voltage prior to opening of breaker contacts. This is because if voltage is depressed and the memory circuit stores only the predominant polarity of the last half cycle (as discussed above) of (depressed) voltage before current flow ceases, the circuit may provide a false polarity. If this occurs, the circuit discussed above will not be able to reduce residual magnetism caused by the last half cycle of full voltage (i.e., not depressed). Therefore, it is desirable to store instead the polarity of the slope of the voltage at the time of voltage depression and to reconnect the load at a zero crossing point immediately preceding a half cycle of voltage that is the same as the slope of the voltage immediately preceding the depression of the voltage.

With regard to the same problem of depressed voltage, an alternative embodiment of the invention provides means for memorizing the predominant polarity of the last half cycle of source voltage (e.g. 50% or greater than typical voltage) or the slope of the source voltage and removing the trigger signal to the thyristor control only at a zero crossing of the (depressed) voltage sinusoid when voltage is the same polarity or slope as that stored in memory. This assures that when the voltage magnitude recovers to the pre-fault value, inrush current will not be present on the upline loads.

The voltage memory circuit is powered by a battery which can be a rechargeable battery. The rechargeable battery can be charged by system voltage while system voltage is available. Thus, the memory circuit continues to store either the polarity of the last half cycle of system voltage or the polarity of the slope of the voltage waveform even when system voltage is not available. The battery can also be recharged by a photovoltaic cell that receives light, via a bundle of fiber optic cables, from a light source and supplies a charging current to the battery. The light source can be powered by system voltage. A light source is used to recharge the battery when it is desired to completely isolate (electrically) the voltage memory circuit from the power distribution system (i.e., in a high voltage situation, such as in a power distribution system). In the preferred embodiment, the battery consists of two rechargeable C cells, providing a 3 Volts DC output. Any suitable battery rated over 1.5 Volts DC can be employed.

One aspect of the invention provides a mechanical switch in series with solid state switchgear, such as anti-parallel thyristors or transistors used as fault protection in an electrical distribution system, which mechanical switch opens after the anti-parallel thyristors or transistors are turned off so as to virtually eliminate the problem of leakage currents that flow through thyristors or transistors even when they are turned off. The problem of leakage currents is aggravated by a temperature rise that occurs when a thyristor has conducted a high value of current.

Other features and advantages of the invention will become apparent to those of ordinary skill in the art upon review of the following detailed description, claims, and drawings.

BRIEF DESCRIPTION OF THE DRAWINGS

FIG. 2 is a circuit schematic illustrating the fuse-switch connection and the anti-parallel thyristors that connect and disconnect a load from a source, which thyristors are selectively gated by the circuit shown in FIG. 1.

FIG. 3 is a circuit schematic illustrating a battery used to power the logic elements shown in FIG. 1 when the load is disconnected from the source, and a battery charging system for charging the battery when the load is connected to the source.

DETAILED DESCRIPTION OF THE PREFERRED EMBODIMENT OF THE INVENTION

Voltage Polarity Memory Circuit-Overview

Figure 1:
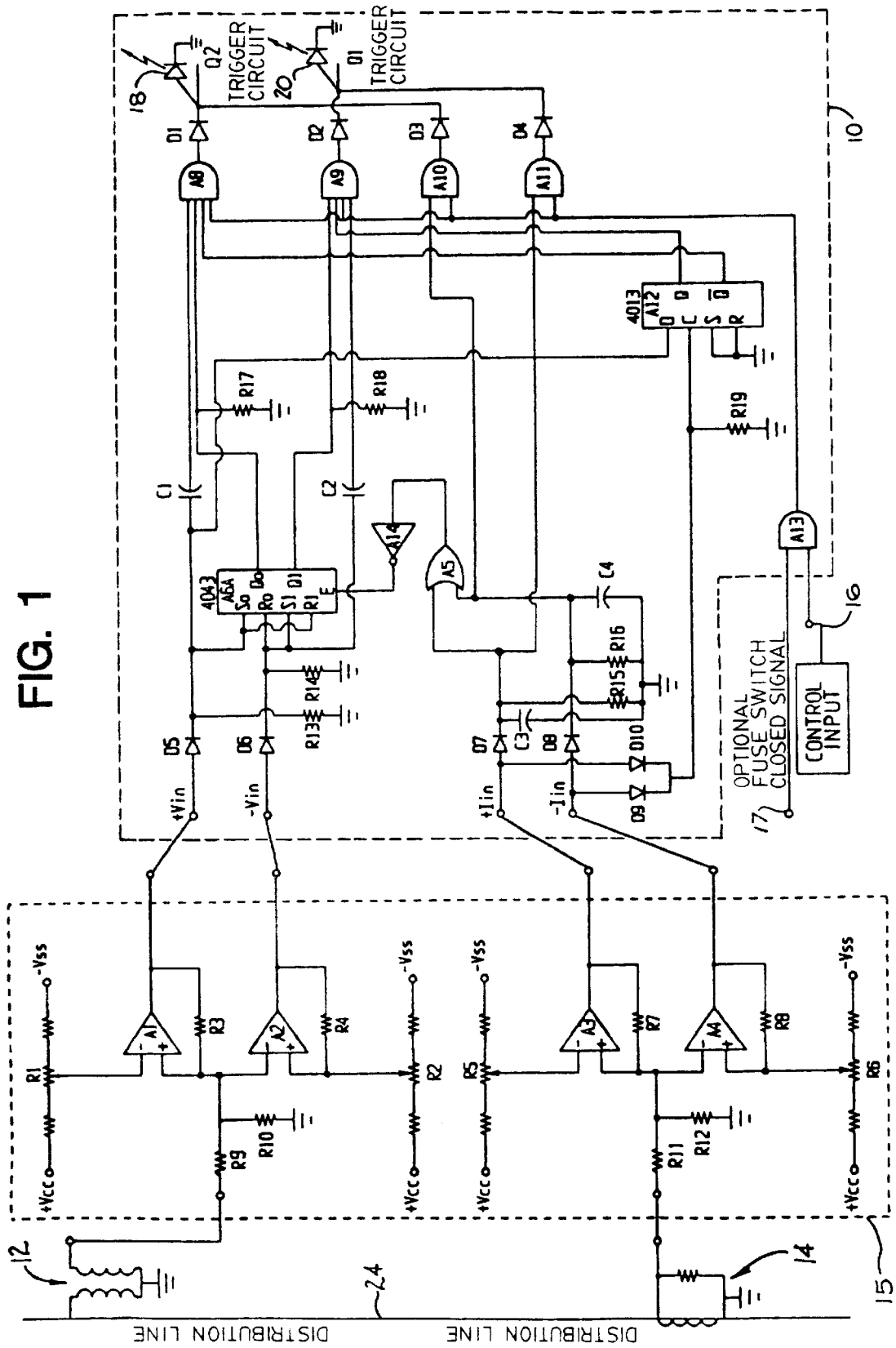
FIG. 1 is a circuit schematic illustrating a voltage polarity memory circuit embodying the invention.

Shown in FIG. 1 is a voltage polarity memory circuit 10 embodying various features of the invention and which can be used to perform various functions that are described above. The voltage polarity memory circuit reduces inrush currents by memorizing the predominant polarity of the last half cycle of source voltage before current flow from the source to a load was interrupted; e.g. by switching or fault interruption means.

The load is reconnected to the source at a zero crossing point of the voltage sinusoid just before the polarity of source voltage is opposite the polarity stored in memory (so that the sinusoid continues cycling in the direction it would have cycled in if there had not been an interruption).

The circuit 10 includes a voltage transformer 12 coupled to a source 24 (e.g., a power distribution line) for sensing source voltage, and a current transformer 14 coupled to the source 24 for sensing current. The circuit 10 further includes a control input 16 for starting and stopping the flow of current by working logically with the voltage and current inputs to gate anti-parallel thyristors Q1 and Q2 (see FIG. 2) that control the flow of line current. When it is desired to connect the load 22 to the source 24, a control signal 17 is supplied to the control input 16. When it is desired to disconnect the load 22 from the source 24, the control signal is removed from the control input 16. The circuit further includes outputs in the form of LEDs 18 and 20 that are optically coupled, via fiber optic bundles or optical couplers 18A and 20A, respectively, to control the anti-parallel thyristors Q1 and Q2 to gate them. In one embodiment of the invention, the LEDs 18 and 20 are portions of a NTE 3086 IC.

Zero Crossing Detector

The circuit 10 includes a zero crossing detector 15. In the illustrated embodiment, the zero crossing detector 15 includes a variable resistor R1. The zero crossing detector 15 further has a op-amp A1 having an inverting input connected to the variable resistor R1 and having a non-inverting input. The zero crossing detector 15 further includes a resistor R9 connected between the non-inverting input of the op-amp A1 and the voltage sensor 12. The zero crossing detector 15 further includes a resistor R10 connected between the non-inverting input of the op-amp A1 and ground. The zero crossing detector 15 further includes a feedback resistor R3 connected between the output and the non-inverting input of the op-amp A1.

The zero crossing detector 15 includes a variable resistor R2. The zero crossing detector 15 further has a op-amp A2 having a non-inverting input connected to the variable resistor R2 and having an inverting input connected to the non-inverting input of the op-amp A1. The zero crossing detector 15 further includes a feedback resistor R4 connected between the output and the non-inverting input of the op-amp A2.

The zero crossing detector 15 includes a variable resistor R5. The zero crossing detector 15 further has a op-amp A3 having an inverting input connected to the variable resistor R5 and having a non-inverting input. The zero crossing detector 15 further includes a resistor R11 connected between the non-inverting input of the op-amp A3 and the current sensor 14. The zero crossing detector 15 further includes a resistor R12 connected between the non-inverting input of the op-amp A3 and ground. The zero crossing detector 15 further includes a feedback resistor R7 connected between the output and the non-inverting input of the op-amp A3.

The zero crossing detector 15 includes a variable resistor R6. The zero crossing detector 15 further has a op-amp A4 having a non-inverting input connected to the variable resistor R6 and having an inverting input connected to the non-inverting input of the op-amp A3. The zero crossing detector 15 further includes a feedback resistor R8 connected between the output and the non-inverting input of the op-amp A4.

Op-amp A1 responds to an AC input signal by providing a positive square wave output when the input 12 is positive. Resistor R1 biases the op-amp A1 so that when no input is present, there is a slight positive voltage at the inverting input of the op-amp A1. This voltage is sufficient to cause the output to be inverted, or negative Vss. Just a small amount of positive voltage at the non-inverting input of op-amp A1 will cause its output to go to positive Vcc.

The positive feedback resistor R3 causes a toggling effect when the output of op-amp A1 goes slightly positive. That voltage is fed back to the non-inverting input of op-amp A1 to cause a higher value of input which, in turn, causes a higher value of output, etc., so that for a very small positive input to the non-inverting terminal of the op-amp A1, the output goes to positive Vcc as rapidly as possible, limited only by the slew rate of the op-amp A1. Similarly, when the input goes just slightly more negative than the bias voltage at the inverting input of the op-amp A1, the output of the op-amp A1 goes to negative Vss.

Op-amp A2 is connected as an inverting comparator to produce an output square wave that is negative when the input is positive, and positive when the input 12 is negative. The non-inverting input is biased at a slightly negative voltage by adjusting variable resistor R2 to cause the output of the op-amp A2 to be negative when there is no input present. When an input is present, a slight negative value will cause the inverting input to be more negative than the non-inverting input bias value. When the input is less than the non-inverting input bias level, the output of the op-amp A2 switches immediately to positive Vcc and stays there until the input 12 goes to a value more positive than the value at the non-inverting input of the op-amp A2, at which time the output again switches to negative Vss and stays there until the inverting input again sees a negative value.

The op-amps A3 and A4 operate in a manner similar to the operation of the op-amps A1 and A2; the op-amps A1 and A2 are used with the current sensor 12, and the op-amps A3 and A4 are used with the voltage sensor 14.

Such a zero crossing detector 15 provides a positive output pulse for the presence of both negative and positive inputs. Voltage must be present for the zero crossing detector 15 to provide an output.

The illustrated embodiment shows the zero crossing detector 15 being used with a voltage transformer 12 and a current transformer 14. In alternative embodiments, the zero crossing detector 15 can be used with linear couplers, which are low output voltage means for sensing current, or with capacitive voltage sensing plates which are also low voltage level output devices. In such alternative embodiments phase correction may be employed to correct a 90° phase shift that is introduced by the linear couplers or capacitive voltage sensing plates.

Voltage Polarity Memory Circuit-Detailed Description

The circuit 10 includes a dual flip-flop A6A. An example of a suitable integrated circuit chip that can be employed for the flip-flop A6A is a 4043 IC. The flip-flop A6A has a first set input S0, a first reset input R0, a first output Q0, a second set input S1, a second reset input R1, a second output Q1, and an enable input E.

The circuit 10 includes a diode D5 having an anode connected to the output of the op-amp A1 and having a cathode connected to the first set input S0 of the flip-flop A6A and to the first reset input R1 of the flip-flop A6A. The circuit 10 includes a diode D6 having an anode connected to the output of the op-amp A2 and having a cathode connected to the first reset input R0 of the flip-flop A6A and to the second set input S1 of the flip-flop A6A. The circuit 10 further includes a resistor R13 connected between the cathode of the diode D5 and ground. The circuit 10 further includes a resistor R14 connected between the cathode of the diode D6 and ground.

The circuit 10 includes an inverter A14 having an output connected to the enable input E of the flip-flop A6A, and having an input. The circuit 10 further includes an OR gate A5 having an output connected to the input of the inverter A14, and having two inputs. The circuit 10 further includes a diode D7 having an anode connected to the output of the op-amp A3 and having a cathode connected to one of the inputs of the OR gate A5. The circuit 10 further includes a diode D8 having an anode connected to the output of the op-amp A4 and having a cathode connected to the other input of the OR gate A5. The circuit 10 further includes a capacitor C3 connected between the cathode of the diode D7 and ground, and a resistor R15 in parallel with the capacitor C3 and connected between the cathode of the diode D7 and ground. The circuit 10 further includes a capacitor C4 connected between the cathode of the diode D8 and ground, and a resistor R16 in parallel with the capacitor C4 and connected between the cathode of the diode D8 and ground.

The circuit 10 includes a D flip-flop A12 which defines a polarity memory. A suitable integrated circuit chip is a 4013

IC. The flip-flop A12 has a DATA input D connected to the cathode of the diode D5, a clock input C, a set input S connected to ground, a reset input R connected to ground, an output Q, and an output Q' (the logical inverse of Q). The circuit 10 further includes a diode D9 having an anode connected to the output of the op-amp A4 and having a cathode connected to the clock input C of the flip-flop A12, and a diode D10 having an anode connected to the output of the op-amp A3 and having a cathode connected to the clock input C of the flip-flop.

The circuit 10 optionally includes an AND gate A13 having a first input which is high when a fuse-switch assembly 100 (described below) is closed, having a second input defining the control input 16, and having an output.

The circuit 10 further includes diodes D1, D2, D3, and D4, and capacitors C1 and C2 which are connected in a manner described below.

The circuit 10 further includes an AND gate A8 having an output connected to the LED 18 via the diode D1, and having four inputs. One of the inputs of the AND gate A8 is connected, via the capacitor C1, to the cathode of the diode D5. Another one of the inputs of the AND gate A8 is connected to the first output Q0 of the dual flip-flop A6A. Another input of the AND gate A8 is connected to the output Q' of the flip-flop A12. Another one of the inputs of the AND gate A8 is connected to the output of the AND gate A13.

The circuit 10 further includes an AND gate A9 having an output connected to the LED 20, via the diode D2, and having four inputs. One of the inputs of the AND gate A9 is connected, via the capacitor C2, to the cathode of the diode D6. Another one of the inputs of the AND gate A9 is connected to the output of the AND gate A13. Another input of the AND gate A9 is connected to the output Q of the flip-flop A12. Another one of the inputs of the AND gate A9 is connected to the output Q1 of the flip-flop A6A.

The circuit 10 further includes an AND gate A10 having an output connected to the LED 18, via the diode D3, and having two inputs. One of the inputs of the AND gate A10 is connected to the cathode of the diode D8. Another one of the inputs of the AND gate A10 is connected to the output of the AND gate A13.

The circuit 10 further includes an AND gate A11 having an output connected to the LED 20, via the diode D4, and having two inputs. One of the inputs of the AND gate A11 is connected to the cathode of the diode D7. Another one of the inputs of the AND gate A11 is connected to the output of the AND gate A13.

If the fuse-switch assembly 100 is not employed, A13 is omitted and replaced with a control input 16 that is connected to one of the inputs of each of the AND gates A8, A9, A10, and A11.

The circuit 10 further includes a resistor R17 connected between the first output Q0 of the flip-flop A6A and ground. The circuit 10 further includes a resistor R18 connected between the second output Q1 of the flip-flop A6A and ground. The circuit 10 further includes a resistor R19 connected between the clock input C of the flip-flop A12 and ground.

In operation, assume that there is no current flowing through the source 24 and that the polarity memory flip-flop A12 has a high on its output Q, indicating that the source voltage was positive when current went through a zero crossing and before it was stopped, and assume that source voltage is present at this time.

Because no current is flowing, the OR gate A5 has a low output, causing inverter A14 to have a high output, enabling D flip-flop A6A to have its Q output set high or reset low depending on the voltage inputs +Vin and −Vin at the anodes of the diodes D5 and D6.

A high control signal on control input 16 will put a high on one of the inputs of each of the AND gates A8, A9, A10, and A11. If the optional fuse-switch assembly 100 (described below) is employed, a high control signal on control input 16 AND with a fuse-switch closed signal will put a high on one of the inputs of each of the AND gates A8, A9, A10, and A11.

Because no current is flowing, there is no +I or −I input at the anodes of diodes D7 and D8. Therefore, AND gates A10 and A11 cannot get an additional high input to cause them to have high outputs.

AND gate A8 will have a low input that is connected to the Q' output of A12 and therefore cannot have a high at its output.

AND gate A9 will have a high at one of its inputs because the output Q of A12 is high. When −Vin is applied to the S1 input of the flip-flop A6A, via the diode D6, the output Q1 of the flip-flop A6A will be high and will provide a high signal to another one of the inputs of AND gate A9. The input to the AND gate A9 connected to differentiating capacitor C2 is a momentary high occurring at the negative going zero crossing of source voltage. For the period of the momentary high, all of the inputs of AND gate A9 are high, and a pulse appears at the output of AND gate A9 to cause LED 20 to be illuminated and thereby cause thyristor Q1 (see FIG. 2) to be triggered.

Thyristor Q1 has its anode positive with respect to its cathode, so it is ready to conduct current. This anode voltage is opposite to the polarity of the current that was present when current was last interrupted. In other words, thyristor Q2 was the last to conduct current before the interruption, and thyristor Q1 is the first to conduct when the control signal is reapplied to control input 16.

Similarly, if the polarity memory flip-flop A12 had a high value at its Q' output, then a +Vin at the anode of D5 would cause all the inputs of the AND gate A8 to be high momentarily so that thyristor Q2 would be triggered.

After current is flowing, there will be inputs alternately at +Iin and −Iin at the anodes of diodes D7 and D8, respectively. These inputs are connected to A10 and A11 inputs to cause triggering of thyristors at zero crossings of current when current is flowing. If a positive half-cycle of current flowed, D7 would couple the extended signal to A11 to cause A11 to conduct at the negative going zero crossing. Conversely, if a negative half-cycle of current flowed, D8 would couple the extended signal to A10 causing A10 to conduct at the positive going zero crossing.

With an input to the OR gate A5, there is a high input to the inverter A14, causing the output of the inverter A14 to go low, and thereby disabling the flip-flop A6A. The Q0 and Q1 outputs of the flip-flop A6A go to high impedance (tri-state), and resistor R17 causes the AND gate A8 to have a low input, resulting in the AND gate A8 having a low output.

The +Iin and −Iin current inputs are slightly extended in pulse width by the capacitors C3 and C4. This causes a slight overlap of the inputs at the OR gate A5, which allows for a continuous high input to the inverter A14, causing its output to be continuously low.

The +Iin and −Iin inputs applied to the clock input C of the flip-flop A12 are not filtered by capacitors; therefore, there is a slight time difference between the falling edge of one input and the rising edge of the other input. This allows for "clocking" the voltage polarity presented at the DATA input D of the flip-flop A12. This is required to continually update the polarity memory stored in the flip-flop A12 each half cycle so that if current is interrupted for any reason, the polarity memory will be correct.

When current is stopped, the predominant polarity of the last half cycle of source voltage is stored in response to the +Iin and −Iin current inputs going high and low, respectively, causing a high transition of the clock input to transfer the polarity of the data present at the DATA or D input to the Q output, and a low going transition of the clock input to latch the Q and Q' outputs (the logical inverse of Q). In other words, if +Vin was high when the current went through a zero crossing, then a high will be transferred to the Q output, and latched there when the clock pulse goes low. This indicates that the voltage for the last half cycle was predominantly positive because it was positive at the start of the half cycle of current flow. If the current again passes through zero, the clock will go high again and transfer the DATA present at the D input to the Q output. When the current is stopped, the DATA that was transferred at the last prior zero crossing will be latched into the Q output, and its' compliment will be latched into the Q' output. If +Vin was low when current stopped, then the output Q' of flip-flop A12 will be high.

In summary, as long as a control signal is present at the control input 16, the anti-parallel control thyristors Q1 and Q2 will alternately conduct at the zero crossing points of source current.

When the control signal is removed from the control input 16, current will cease at the next zero crossing, and the level of the Q and Q' outputs will be latched by the low transition of the clock signal when the current ceases, and will be used as the information needed to determine which thyristor will be gated (by the LED 18 or 20) when the control signal is reapplied to the control input 16.

"Gate-Turn-Off" type thyristors can be used in place of the anti-parallel thyristors, in which case, the current can be stopped at any point of the current wave. In this case, a computing circuit including a microprocessor (see FIG. 6) is employed to control the turn-on and turn-off of the thyristors Q1 and Q2.

Figure 4:
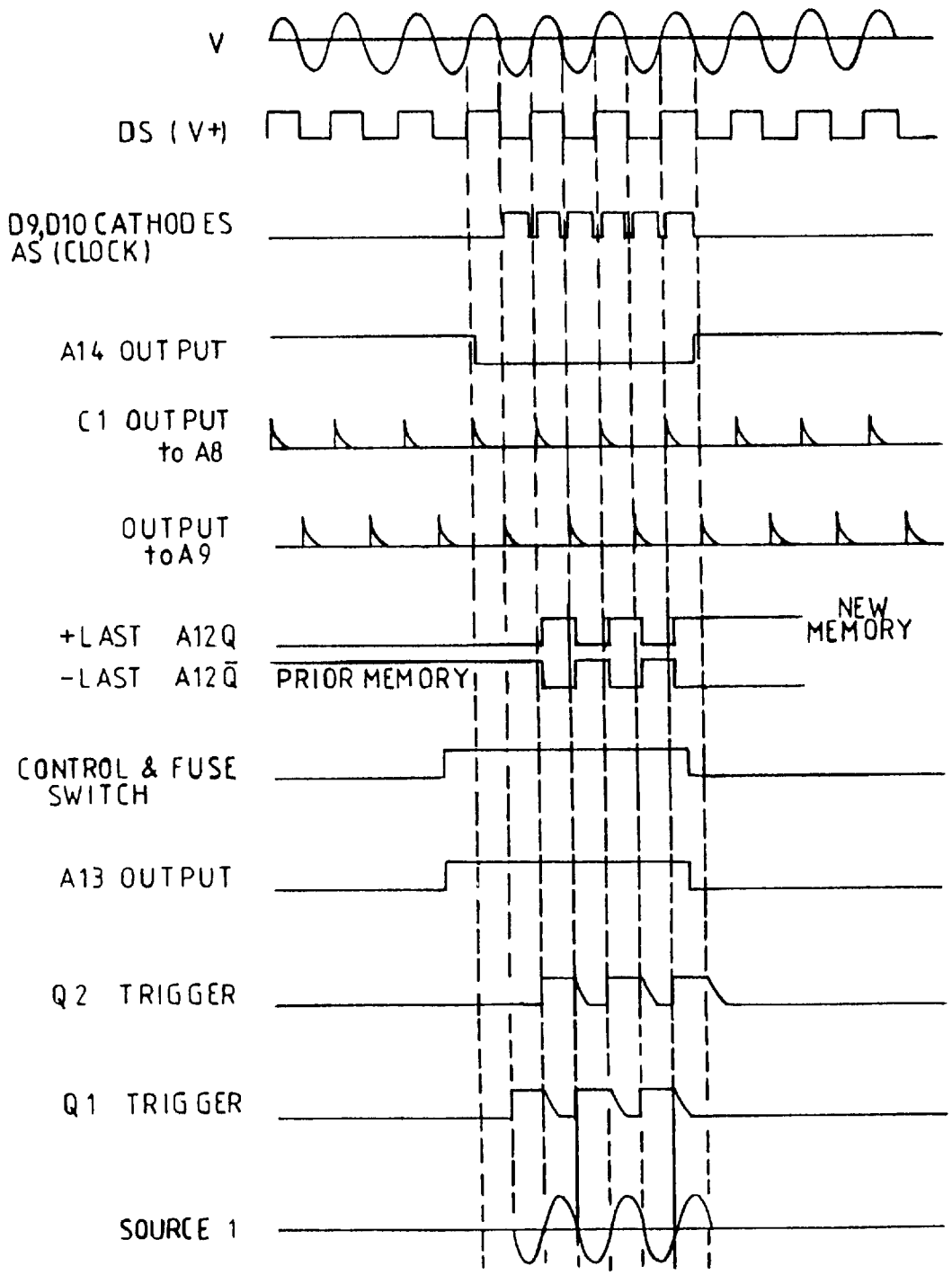
FIG. 4 is a timing diagram illustrating the logical states of the logic elements shown in FIG. 1 at various times and illustrating how the logic states vary depending on a control input signal.

FIG. 4 is a timing diagram illustrating output waveforms of various of the components described above as they respond to source current and voltage.

The above-described embodiment is effective to disconnect the load downstream of the thyristors Q1 and Q2 from the power distribution system. However, the incoming voltage from the distribution line 24 is, on occasion, arbitrarily lost, as might occur if power distribution lines are downed upstream of the circuit 10. In this situation, measurement of the predominant polarity of the last half cycle of voltage may result in ineffective operation of the circuit 10 thereby causing maximum inrush circuit when thyristors Q1 and Q2 are reenergized.

Figure 1A:
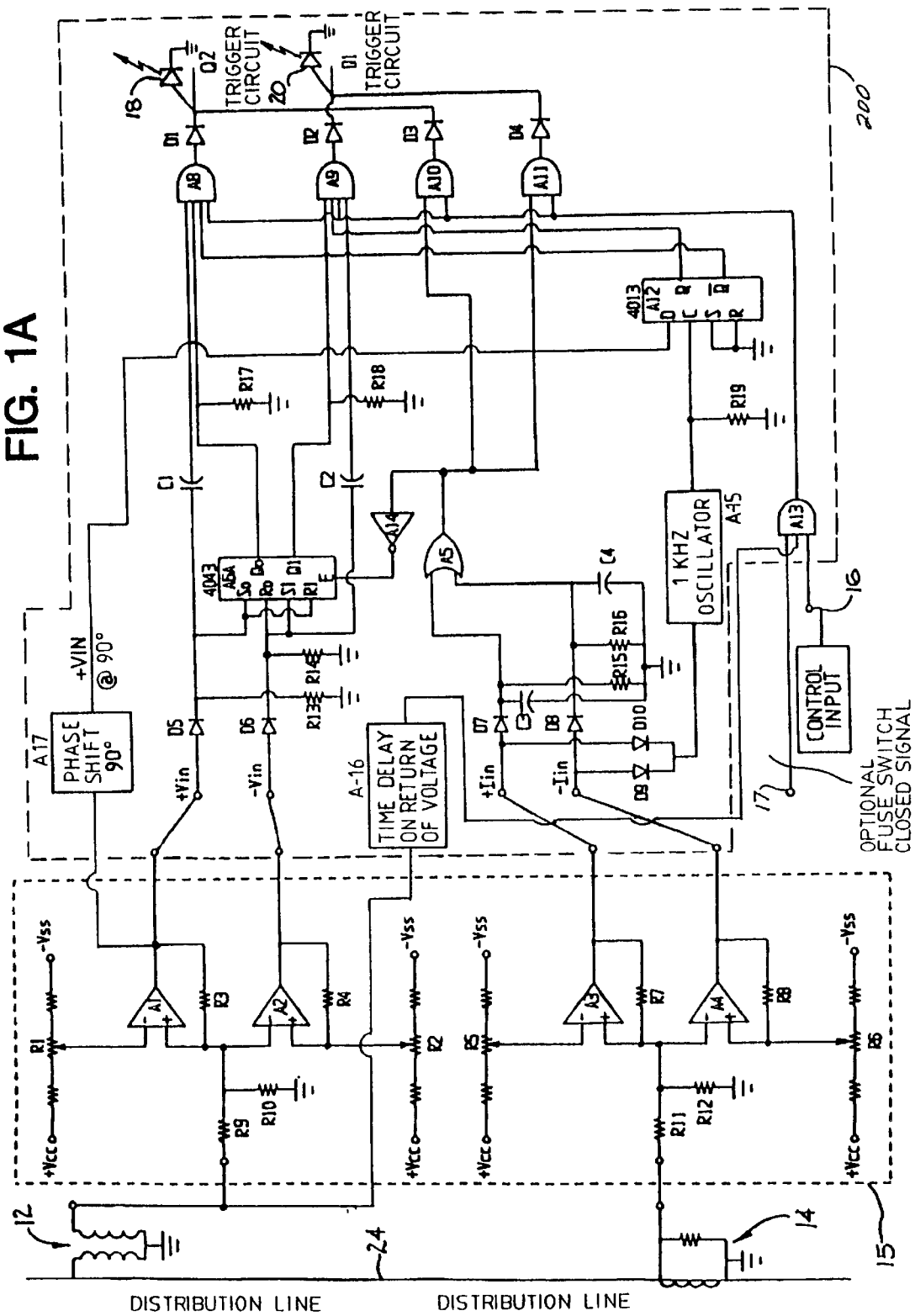
FIG. 1A is a circuit schematic illustrating a circuit that is a first alternative embodiment of the invention.

FIG. 1A illustrates a circuit 200 that is an alternative embodiment of the circuit 10 designed for use in this particular situation. As shown in FIG. 1A, circuit 200 includes a phase shift circuit A17 connected between the output of A1 and the DATA input of A12. The circuit A17 displaces the DATA input to the D flip-flop A12 by 90 degrees. Such phase shift circuits are commonly known in the art. The circuit also includes a 1 khz oscillator connected between the cathodes of D9 and D10 and the clock input (or enabling line) of flip-flop A12. The effect of the 90 degree phase shift is that the portion of the voltage waveform having a negative slope is always present as a high on the DATA line, and the portion of the voltage waveform having a positive slope is always present as a low on the DATA line. Thus, rather than storing a positive polarity between zero and 180 degrees of the voltage waveform and a negative polarity between 180 and 360 degrees of the voltage waveform as does the embodiment of FIG. 1 (see FIG. 4), the embodiment of FIG. 1-A stores a polarity that is positive between 90 and 270 degrees on the voltage waveform and that is negative between 270 degrees and 90 degrees on the voltage waveform. The result of storing DATA input based upon the 90 degree phase shifted voltage waveform, is that the voltage polarity memory stores a polarity that represents the polarity of the slope of the voltage waveform at the moment that the voltage or current is cut-off. The advantage of determining the polarity of the slope of the voltage waveform is twofold. First, in an inductive circuit such as a transformer, the voltage leads the current in time. Thus, when the voltage waveform goes through a zero crossing and has a positive slope, the resultant current waveform will still be negative for some period of time. This amount of time is the amount of time by which the voltage is said to lead the current and is dependent upon the inductance of the load. If the polarity of the voltage is stored at the time that the current ceases just after a positive going zero crossing of the current waveform, then a positive polarity will be stored and, when the circuit 200 is reenergized, the current will start flowing when the voltage goes through zero in a negative going direction (i.e., the polarity of the slope of the voltage waveform would be negative). This would be an error because, prior to circuit cut-off, the voltage waveform had been predominately negative. Therefore, reenergizing the transformer with a negative going voltage will result in nearly maximum magnetizing inrush circuit.

Second, in the situation where the voltage is removed before the natural zero crossing of the current waveform, the voltage should be ideally reapplied at the zero crossing that is on the same slope of the voltage waveform as the voltage waveform was on when voltage was removed.

An advantage of using a high frequency pulse such as the one kilohertz pulse provided by oscillator A15, is that the DATA input to A12 can be transferred and latched every millisecond, or about every 22 degrees in a 60 Hz system. This results in the Q and Q' outputs of A12 being very nearly the real-time representation of the polarity at the DATA input. In other words, the state (high or low) of the phase shifted data is transferred to memory just prior to circuit cut-off, and is latched in memory when circuit is cut-off. This allows for nearly ideal slope detection resulting in a very precise determination of the next zero crossing on which to energize or trigger the thyristors Q1 and Q2. It is possible to use an even higher frequency of oscillation and this would result in even closer realization of a true 180 degree slope.

Still referring to FIG. 1A, the circuit 200 differs from the circuit 10 further in that inputs to AND gates A10 and A11 are connected to the output of OR gate A5 rather than to the inputs to OR gate A5. This circuit construction eliminates the dependence of AND gates A10 and A11 on the proper phasing of the current sensing means. Thus, A10 and A11 will operate properly if they are continuously gated, the inputs to A10 and A11 can be obtained from the output of OR gate A5 which is a continuous high whenever current is flowing.

The circuit 200 also includes time delay circuit A16 connected between the voltage transformer 12 AND gate A13. The time delay circuit A16 is one which is generally known in the art and provides a time delay of several cycles before voltage can be restored after it has been lost. In operation, circuit A16 senses the line voltage at its input and, after approximately three full cycles of voltage circuit A16 outputs a high signal to AND gate A13 so that trigger signals can be issued to thyristors Q1 and Q2. If voltage is lost, circuit A16 outputs a low to AND gate A13 preventing gating of the thyristors. This allows the correct zero crossings to be coupled through D5 and D6 to AND gates A8 and A9 when voltage is restored and allows for up-line restoration of voltage at any point on the voltage sine wave. Nevertheless, and as described above, the thyristor controlled load will only be energized at the correct zero crossing.

Figure 1B:
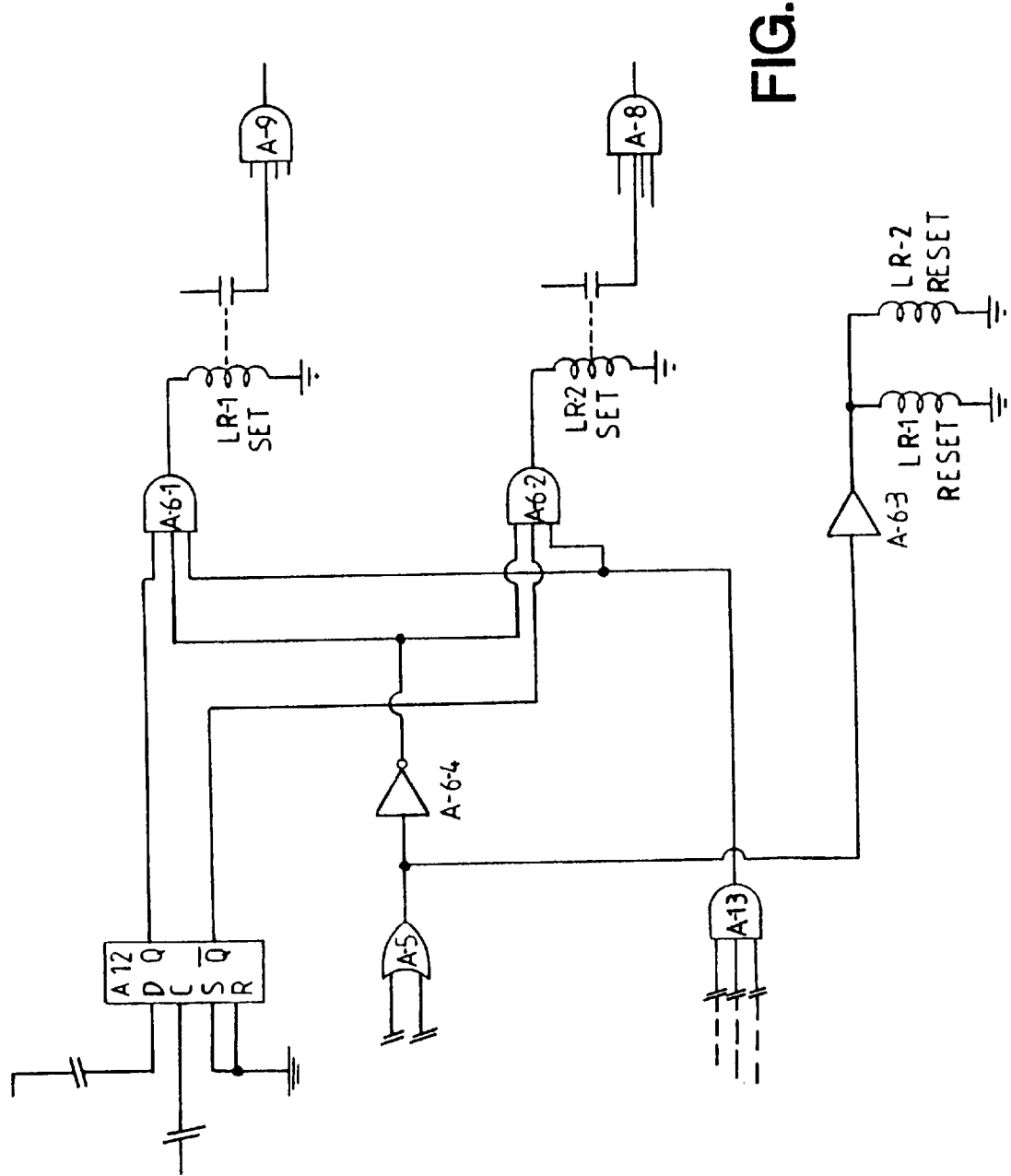
FIG. 1B is a portion of a circuit schematic illustrating a circuit that is a second alternative embodiment of the invention.

FIG. 1B illustrates a portion of a circuit 300 that is another embodiment of the invention in which the Q and Q' outputs of D flip-flop A12 drive latching relays once the circuit is stopped. The circuit 300 is similar to the circuits 10 and 200 and like parts are identified using like reference numerals. The latching relays provide a permanent data memory that does not require continuous power (such as would be provided by a battery back-up system) in order to maintain the memory. The latching relays are reset by sensing current flow, which indicates that the thyristors have been triggered. In operation, when current stops, the output from A5 is low and is input to invertor A64 which outputs a high to AND gates A6-1 and A6-2. If the Q output of D flip-flop A12 is high, and all the control signals are present to A13 then AND gate A6-1 generates a high output thereby energizing latching relay LR-1. Latching relay LR-1 closes the contact connected to the one of the inputs to AND gate A9. If the Q' output of A-12 is high, and all of the control signals are present at the inputs of AND gate A13, then AND gate A6-2 energizes latching LR-2 to close the contact connected to AND gate A8. When current starts to flow once again, OR gate A5 generates a high output which drives amplifier A6-3 to reset latching relays LR-1 and LR-2 thereby clearing the memory.

As will be readily apparent to one of ordinary skill in the art, various other arrangements of logic components can be employed to provide the same function and logic of the circuits described above to trigger the thyristors Q1 and Q2. The functions performed by the various embodiments shown in FIG. 1, FIG. 1A and FIG. 1B and described above can also be performed by digital means employing microprocessors. The microprocessors would be programmed to determine the phase angle of the voltage waveform from the voltage zero crossing at the moment when current ceases to flow or at the moment when voltage was removed from the input to the circuits 10 or 200. Utilizing this information, the slope of the voltage could be determined in order to establish the zero crossing of the voltage at which a particular thyristor Q1 or Q2 should be energized so that the voltage reapplied to the load continues in the same direction as the voltage was going when the current stopped or when the voltage was removed.

Battery for Voltage Polarity Memory Circuit

The flip-flops, AND gates, OR gates, op-amps, and inverters of FIG. 1 are powered by a battery 26 (see FIG. 3) which, in the illustrated embodiment, is a rechargeable battery. Thus, the memory circuit continues to store the polarity of the last half cycle of source voltage even when source voltage is not available. The battery is recharged by a photovoltaic cell 28 that receives light, via a bundle 30 of fiber optic cables and lens 32, from a light source and supplies a charging current to the battery 26. The light source can be powered by source voltage. A light source is used to recharge the battery so that the voltage memory circuit is completely isolated (electrically) from the source (e.g., when the source is a power distribution system). In the illustrated embodiment, the battery provides a 12 Volts DC output, centertapped to provide + and −6 Volts (+Vcc and −Vss, respectively).

The anti-parallel thyristors Q1 and Q2 are gated by circuits including LEDs 18 and 20, respectively, which circuits each include a battery 34 which, in the illustrated embodiment, are rechargeable batteries. In one embodiment (not shown), each battery 34 consists of two rechargeable C cells, providing a 3 volts DC output. Any suitable battery rated over 1.5 volts DC can be employed.

Each battery 34 is recharged by a photovoltaic cell 36 that receives light, via a bundle 38 of fiber optic cables and lens 40, from a light source and supplies a charging current to the battery 34. The light source can be powered by source voltage. A light source is used to recharge the battery so that the thyristor gating circuits are completely isolated (electrically) from the power distribution system.

Voltage Polarity Memory Software

Figure 5:
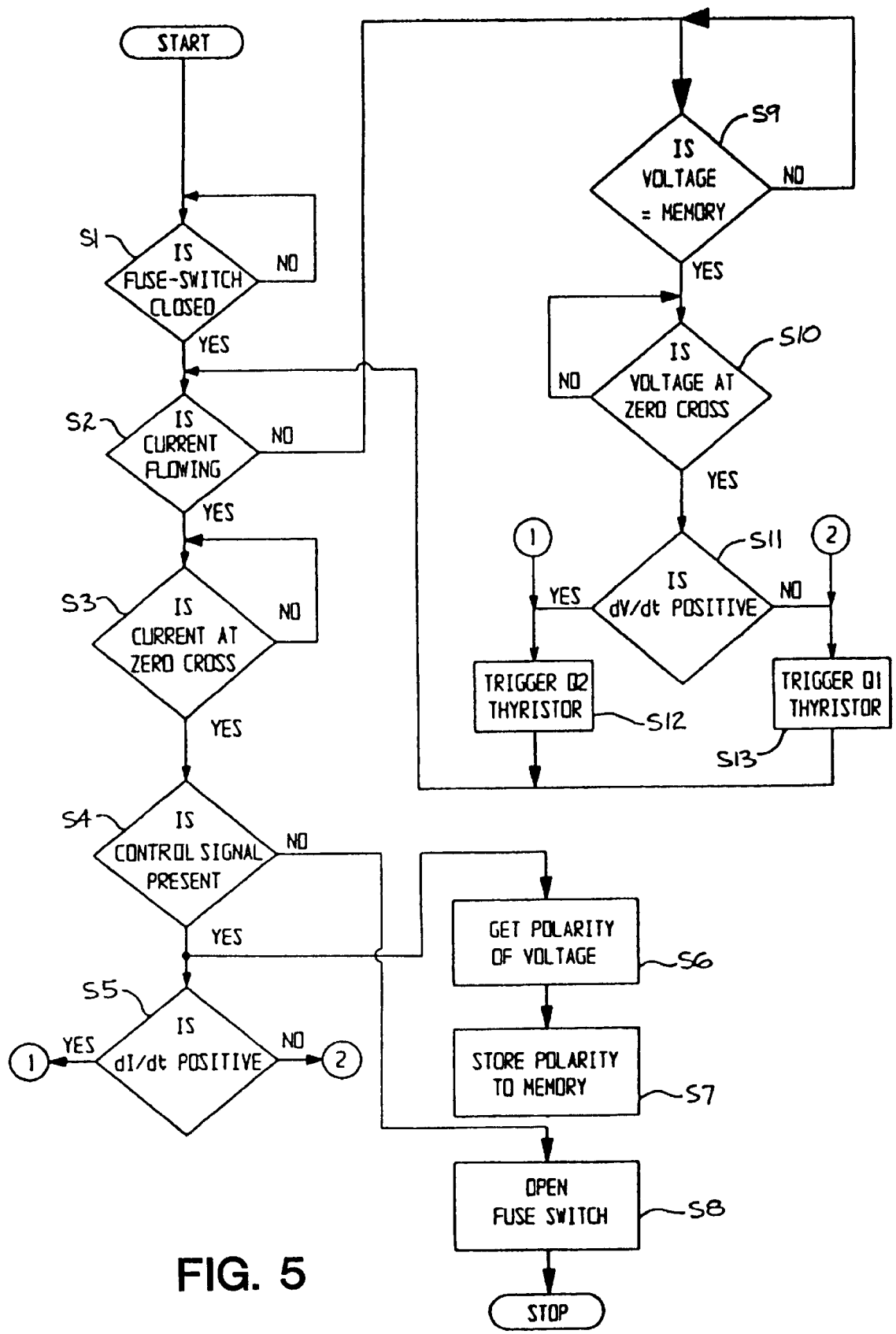
FIG. 5 is a flowchart for a software based control system including logic providing for voltage polarity memory.

Shown in FIG. 5 is a flowchart illustrating a software based control system that performs the same functions of the logic circuit described above. The software based voltage polarity memory control system eliminates inrush currents by memorizing, when the current last goes through a zero crossing, the predominant polarity of the last complete half cycle of source voltage before current flow from the source to a load was interrupted; e.g. by fault interruption means.

The load is reconnected to the source, using anti-parallel thyristors Q1 and Q2, at a zero crossing point of the voltage sinusoid just before the polarity of source voltage is opposite the polarity stored in memory (so that the sinusoid continues cycling in the direction it would have cycled in if there had not been an interruption).

The control system includes software programmed into a microcontroller, a microprocessor, or a computer such as an IBM compatible personal computer having an Intel 8086, 8088, 286, 386, 486, or Pentium processor, an Apple or McIntosh computer having a Motorola 6800, 68000 or other processor, or any other suitable personal computer. In the preferred embodiment, the software is programmed into a microcontroller such as a Motorola 68C11 or 6809. As used herein, the term "microprocessor" is intended to encompass all of these devices.

A control signal to start the software program can be initiated in several ways. It can come from a local overcurrent sensing control, or it can be a remote SCADA (Supervisory Control and Data Acquisition) signal or it can be any of the usual remote and local control signals commonly used to control switchgear.

If a fuse-switch assembly 100 is employed, a start signal causes the fuse-switch assembly 100 (described below) to close by either manual action or by energizing some powered mechanical apparatus. At the same time, a control signal is applied to cause the thyristors Q1 and Q2 to conduct when conditions are correct for them to do so.

If an optional fuse-switch assembly 100 (described below) is employed, the microprocessor looks, at step S1, for a signal indicating that the fuse-switch assembly 100 is closed before proceeding to step S2.

If the fuse-switch assembly 100 is not employed, step S1 is omitted.

At step S2, the microprocessor checks to see if source current is flowing. If so, it proceeds to step S3; if not, it proceeds to step S9.

At step S3, the microprocessor waits for a zero crossing point of source current and then proceeds to step S4. Thyristors naturally turn off at the zero crossing of current.

At step S4, the microprocessor determines if a control signal is still present. The control signal sensed as step S4 is similar to the control signal applied to the control signal input 16 in the voltage polarity memory circuit discussed with FIG. 1; it indicates that it is desired to keep firing the thyristors. If the control signal is still present at the zero crossing of source current, the microprocessor proceeds to step S5 and S6; if not, the microprocessor proceeds to step S8. If the fuse-switch assembly is employed, the microprocessor proceeds to step S8 where it opens the fuse-switch assembly. The microprocessor then waits for another start control signal before proceeding to step S1.

At step S5, the microprocessor determines whether the slope of source current with respect to time is positive. If so, the microprocessor proceeds to step S12; if not, the microprocessor proceeds to step S13. In other words, the microprocessor analyzes the slope of the zero crossing of source current (dI/dt) to determine whether thyristor Q1 or thyristor Q2 should be fired.

At step S6, the microprocessor determines the polarity of source voltage, after the current passes through zero crossing, and proceeds to step S7.

At step S7, the microprocessor stores the polarity of source voltage (measured at step S6) in memory.

At step S9, the microprocessor looks at its voltage measuring inputs to see if the polarity of the source or distribution line voltage is the same as the polarity that is stored in polarity memory. If there is no voltage present on the source or distribution line, the microprocessor continually monitors until voltage is present. If the measured polarity doesn't match the stored polarity, the microprocessor keeps checking the source until the polarity of the source voltage matches the polarity in memory before proceeding to step S10. The polarity stored in memory is the predominant polarity of the last complete half cycle of voltage after the current passes through zero crossing and before the control signal was removed and the conducting thyristor Q1 or Q2 was turned off.

At step S10, the microprocessor waits for a zero crossing point of source voltage and then proceeds to step S11.

At step S11, the microprocessor determines whether the slope of source voltage with respect to time (dV/dt) is positive. If so, the microprocessor proceeds to step S12; if not, the microprocessor proceeds to step S13. The slope of the voltage as it passes through the zero crossing is an accurate predictor of what the polarity of the next half cycle of voltage will be, before it is there to measure. At step S12, the thyristor Q2 is triggered. The microprocessor then proceeds to step S2.

At step S13, the thyristor Q1 is triggered. The microprocessor then proceeds to step S2.

In summary, if no current is flowing, after the microprocessor makes a polarity match between the polarity of measured voltage and the polarity in memory at step S9, then the slope of the voltage is checked at step S11 to see if it is positive or negative. If the polarity in memory is positive, then the thyristor that conducts on the negative half cycle of voltage is triggered. If the polarity in memory is negative, then the thyristor that conducts on the positive half cycle of voltage is triggered. If the polarity stored in memory is positive, Q1 was the last thyristor to conduct when the control signal was removed, and Q2 should be the next thyristor to conduct when the control signal is reapplied.

After a thyristor has been triggered, the microprocessor again checks to see if current is flowing. If current is flowing, then the microprocessor looks for a zero crossing. If the control signal is still present at the zero crossing of source current, then the slope of the zero crossing is analyzed to determine whether thyristor Q1 or Q2 is to be triggered. The analysis is similar to that used to determine which thyristor to trigger from the slope of voltage at the voltage zero crossing.

If no control signal is present at the current zero crossing, then the program goes to the voltage measuring circuits to determine the polarity of voltage at the instant of the prior current zero crossing and stores that polarity to the polarity memory. If employed, the optional fuse-switch assembly 100 is opened by a spring or motor operated mechanism. The microprocessor waits for another start signal.

It is to be understood that when the microprocessor is initially installed on a distribution line, there is no history of prior voltage polarity on the distribution line and the polarity stored in memory will be a random positive or negative for the first time the program is initiated, until the memory is updated at step S7.

Voltage Polarity Memory Software-Synchronous Switch

In one embodiment of the invention, synchronous switches (that close at a phase angle that can be specified) control connection of the load to the source or power distribution system.

Figure 6:
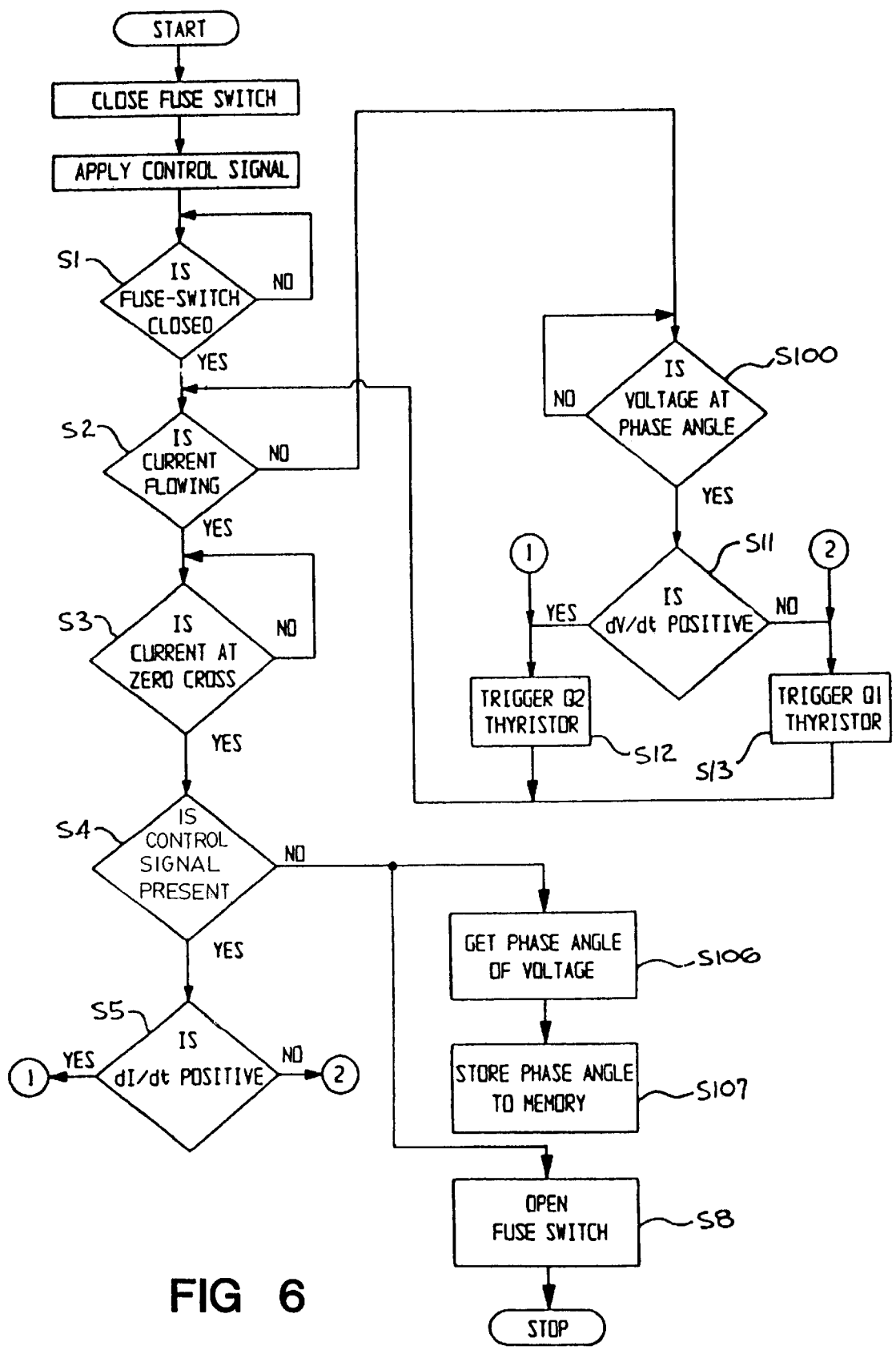
FIG. 6 is a flowchart for a software based control system, for use with a synchronous switch, including logic providing for voltage polarity memory.
Figure 7:
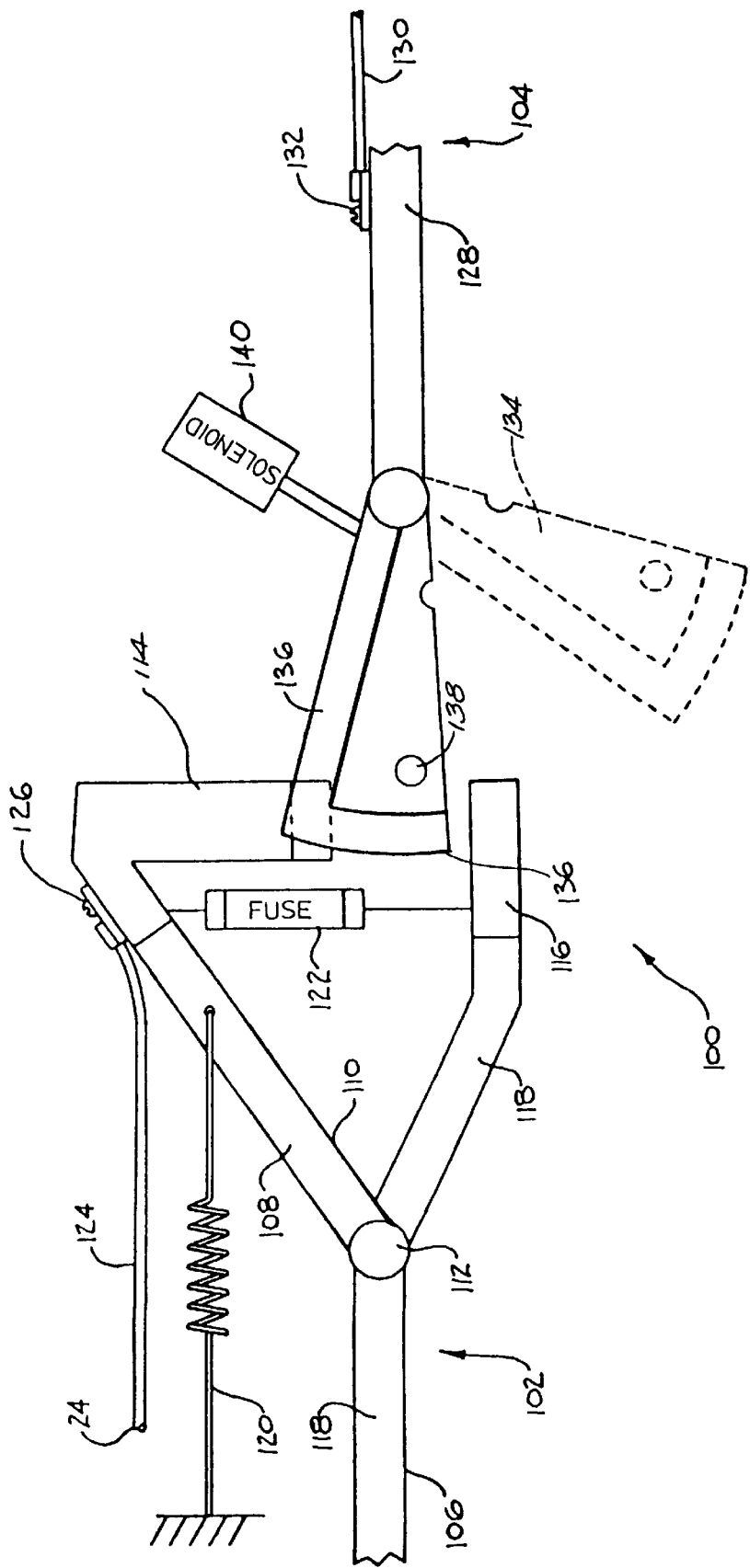
FIGS. 7–10 illustrate a fuse-switch assembly.
Figure 8:
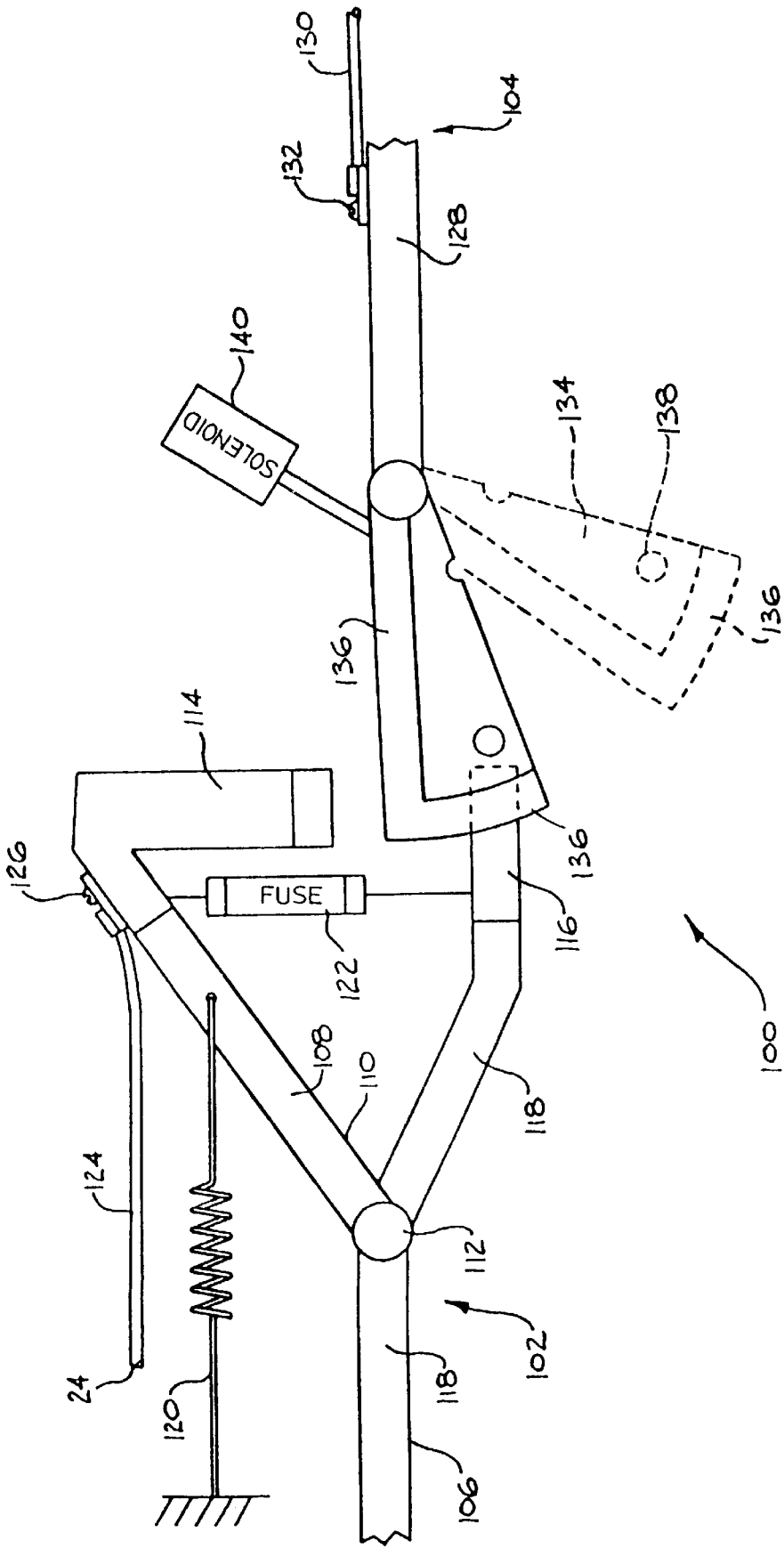

Shown in FIG. 6 is a flowchart illustrating a software based control system for use with such synchronous switches. The software is programmed into a microprocessor of the type specified above in connection with FIG. 5. The software is similar to the software described in connection with FIG. 5, like reference numerals indicating like logic steps, but is modified as described below.

More particularly, step S10 is replaced with step S100. At step S100, instead of determining whether source voltage is at a zero crossing, the microprocessor waits until voltage is at the phase angle stored in memory before proceeding to step S11. This is so that the load is connected to the source at the same phase angle of voltage that was present when the load was disconnected from the source.

Steps S6 and S7 are replaced with steps S106 and S107, respectively. At steps S106 and S107, the microprocessor gets the phase angle of voltage, and stores in memory the phase angle of voltage. The fuse switch is then opened.

In summary, the phase angle of power distribution source voltage is monitored when the control signal has been removed and the current ceases and the phase angle is stored in memory. At the time when current ceases to flow through the synchronous switch, the phase angle of the system voltage remains in memory. The synchronous switch is controlled such that current is allowed to start flowing from the system to the load only at the phase angle stored in memory so that the sinusoid continues cycling in the same direction that it would have cycled if there had been no interruption.

Voltage Polarity Memory Software-Depressed Voltage

In one embodiment of the invention instead of using a zero crossing to determine the polarity of memory stored at step S6 of FIG. 5, source voltage for a half cycle must be at least 50% (or some other predetermined fraction) of peak source voltage before the polarity in memory can be changed. Half cycles that do not exceed 50% of peak source voltage are ignored as far as updating polarity in memory at step S6 is concerned. In this embodiment, steps S6 and S7 will occur between steps S3 and S4, and memory will be updated every half cycle where source voltage is at least 50% (or the other predetermined fraction) of peak source voltage. This embodiment is useful where line conditions may cause voltage to become depressed. The highest "last level" of voltage is the one that will cause the most transformer core saturation. Depressed voltage levels will have their origin on a hysteresis curve somewhere between zero and the maximum residual point, and will not provide total demagnetization. Thus, after the load is disconnected from the source, it is desirable to reconnect the load at a zero crossing point just prior to a half cycle with a polarity opposite to the polarity of the last full (e.g., over 50% of peak) half cycle. As will readily be apparent to one of ordinary skill in the art, various other arrangement of logic components can be connected to perform the logical functions described for the microprocessor controls.

Fuse-Switch Assembly

Shown in FIGS. 7–10 is a fuse-switch assembly 100 for use with solid state control circuitry in an electrical power distribution system. The fuse-switch assembly 100 provides a mechanical switch in series with solid state switchgear, such as anti-parallel thyristors or transistors used as fault protection in an electrical distribution system, which mechanical switch opens after the anti-parallel thyristors are turned off so as to virtually eliminate the problem of leakage currents that flow through thyristors even when they are turned off. The fuse-switch assembly 100 is preferably placed on the source side of the control for the solid state switchgear so that the fuse-switch assembly 100 can be manually opened to permit maintenance of the control for the solid state switchgear which will be completely de-energized. See FIG. 2. The operation of the fuse-switch assembly 100 is unchanged if it is inserted in the load side of the thyristor.

In the preferred embodiment, the fuse-switch assembly 100 is used with the thyristors Q1 and Q2 shown in FIG. 2.

The fuse-switch assembly 100 gives a visual indication of an open circuit.

The fuse-switch assembly 100 includes a source side assembly 102 and a load side assembly 104.

The source side assembly 102 includes a fixed support member 106, and a moveable arm 108. The arm 108 has a non-conductive portion 110 pivotally connected to the support member 106 at a pivot point 112, and a conductive portion 114 adjacent the non-conductive portion 110 and spaced apart from the pivot point 112. The arm 108 is moveable between an operating position (see FIG. 7), and a fault indicating position (see FIG. 10). In the illustrated embodiment, the operating position of the arm 108 is a lowered position, and the fault indicating position of the arm 108 is a raised position. The support member 106 has a conductive portion 116 which is spaced apart from the conductive portion 114 of the arm 108 when the arm 108 is in its operating position as well as when the arm 108 is in its fault indicating position. The support member 106 further has a non-conductive portion 118 adjacent the conductive portion 116. The arm 108 is connected to the support member 106 at the non-conductive portion 118 of the support member 106.

The source side assembly 102 further includes a spring 120 biasing the arm 108 to its fault indicating position. The source side assembly 102 further includes an expulsion type fuse 122 extending between the conductive portion 114 and the conductive portion 116. The fuse 122 retains the arm 108 in its operating position against the bias of the spring 120. The fuse 122 is electrically connected between the conductive portion 114 and the conductive portion 116, and is of a very low fuse rating. The fuse 122 will blow if there is any current above the fuse rating passing though the fuse 122. If the fuse 122 blows, the spring 120 pivots the arm 114 to its fault indicating position (see FIG. 10).

The conductive portion 114 is electrically connected to a power source 24, such as a power distribution system, via a cable 124 and connector 126.

The load side assembly 104 includes a fixed support member 128 which is electrically conductive and which is connected to a load via a cable 130 and a connector 132. If the fuse-switch assembly 100 is used with the voltage polarity memory circuit 10 employed above, then the cable 130 is connected to the anode of the thyristor Q2 and the cathode of the thyristor Q1. Thus, the fuse-switch assembly 100 will be up-line of the voltage polarity memory circuit 10, thus enabling maintenance to be performed on the voltage polarity memory circuit 10 by opening the fuse-switch assembly.

Figure 9:
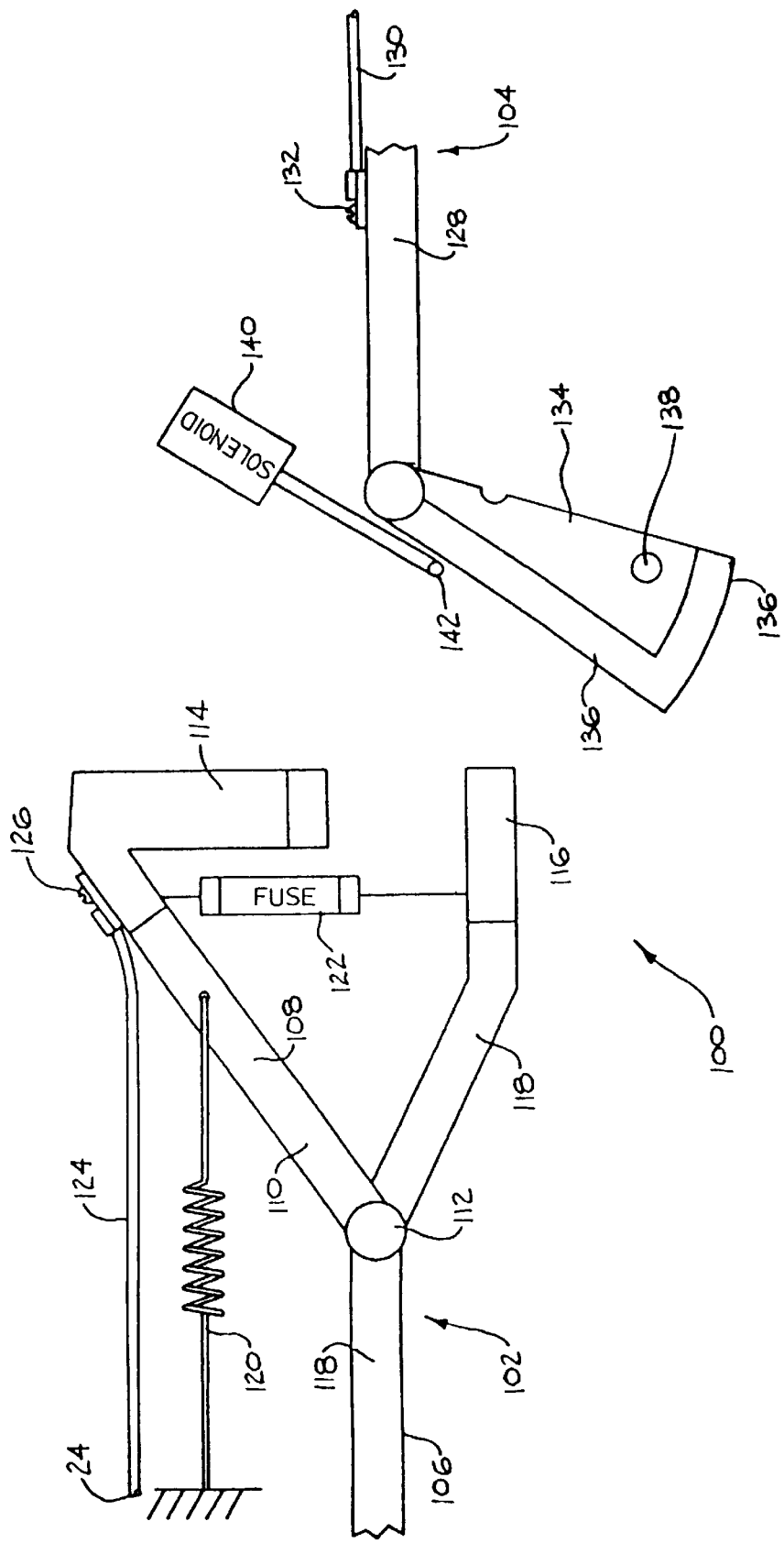
Figure 10:
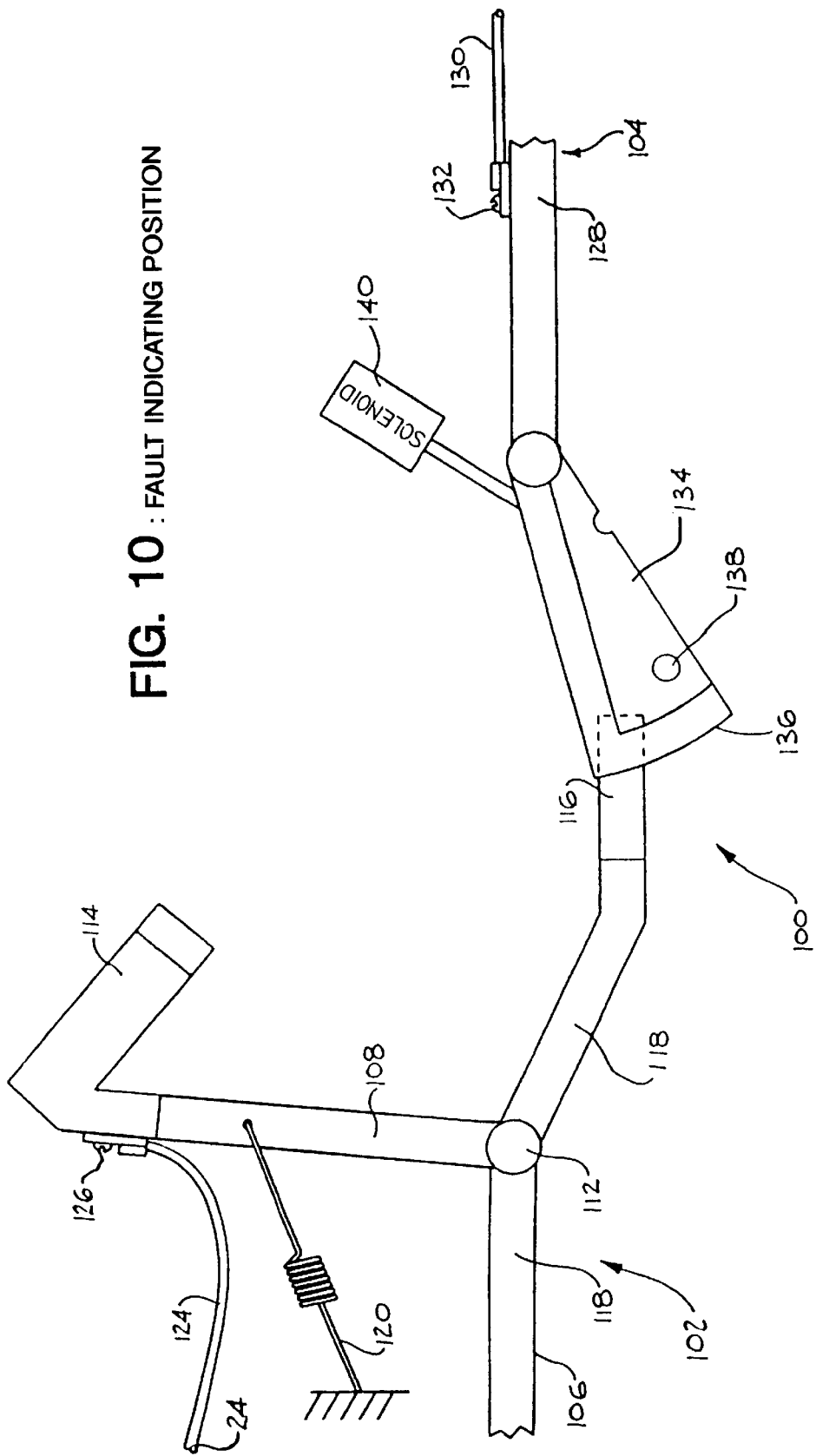

The load side assembly 104 further includes a moveable contact 134 pivotally connected to the support 128 for movement between a closed position (see FIG. 7) and an open position (see FIG. 9). In the illustrated embodiment, the closed position of the moveable contact 134 is a raised position, and the open position of the moveable contact 134 is a lowered position. The moveable contact 134 includes a conductive portion 136 which is electrically connected to the load when the moveable contact 134 is in its closed position and when the moveable contact 134 is in its open position. More particularly, in the illustrated embodiment, the moveable contact 134 is in electrical contact with the support 128 when the moveable contact 134 is in its open position and when the movable contact 134 is in its closed position. The moveable contact 134 is pivoted by any of various appropriate means. For example, the moveable contact 134 can be pivoted to its raised position by either a motor, or a hookstick (using hookstick hole 138), and can pivoted to its lowered position by a solenoid, or a hookstick (using hookstick hole 138). The reference numeral 140 is used to indicate means for moving the moveable contact 134. The conductive portion 136 contacts the conductive portions 114 of the source side assembly 102 when the moveable contact 134 is in its raised position; momentarily, simultaneously contacts portions 114 and 116 when being raised to the closed position or lowered to the open position; and contacts only the conductive portion 116 of the source side assembly 102 when the moveable contact 134 is pivoted to a position (see FIG. 8) between its closed position and its open position. In the preferred embodiment, the load side assembly 104 further includes a selectively releasable latch 142 which permits the moveable contact 134 to be moved to the raised position but then latches the moveable contact 134 in the raised position until released.

In operation, the arm 108 is normally in its closed position (see FIG. 7), the moveable contact 134 is normally in its closed position, the thyristors Q1 and Q2 are conducting. A current path is defined, via the arm 108 and the moveable contact 134, from the source 24 to the load 22. Conductive portion 136 need not be making electrical contact with conductive portion 116 when the switch is closed. This prevents a high current causing a voltage drop that would blow a low current fuse.

When the thyristors Q1 and Q2 are signalled to turn off, a signal is simultaneously sent to the moving means 140 to cause it to start moving the moveable contact 134 to its open position and to the latch 142 to cause it to release the moveable contact 134. The thyristors Q1 and Q2 stop conducting at the first zero crossing point of the current sinusoid, the latch 142 releases, and the moveable contact 134 starts to move to the open position (see FIG. 9). The moving means 140 moves the moveable contact 134 sufficiently slow to allow operation of the fuse 122 at low currents.

As the moveable contact 134 starts to move to the open position, an open gap appears between the top of the moveable contact 134 and the conductive portion 114 of the arm 108 (see FIG. 9). This does not cause current interruption to the load if current is flowing (i.e., if there is a problem with the thyristors). Instead, if current is flowing from the source 24 to the load 22, the current is diverted though the fuse 122. The fuse 122 is of the expulsion type and opens, and the arm 108 is moved by the spring 120 to its fault indicating position (see FIG. 10). The fuse action causes current to be interrupted, and the moveable contact 134 has not seen any current interruption service. Human observers will be given a visual indication (the position of the arm 108) that there is a problem with the thyristors, as well as a visual indication that there is no current flowing to the load. Thus, repair people can feel safe that there is no risk of shock if they work on the load side.

When the thyristors have been repaired, the fuse 122 is replaced so that the arm 108 is in its closed position. The moveable contact 134 is then moved from its open position toward its closed position either by moving means 140 or manually by a hookstick. The conductive portion 136 of the moveable contact 134 initially makes contact with the conductive portion 116 of the support 106 without making contact with the conductive portion 114 (see FIG. 8).

If current is still available from the source, something is wrong on the source side. The current will flow through the fuse 122, because the conductive portion 114 is spaced from the contact 136. Because a current path is available through the fuse 122, the conductive portion 116, and the conductive portion 136, from the source to the load, the fuse 122 will blow and the arm 108 will be moved to its open position (see FIG. 10) by the spring 120, thus indicating that there is still a problem on the source side. The moveable contact 134 will move to the closed position and be latched by the latch 142; however, the moveable contact 134 has not had any current interruption service, and no current path is available from the source side to the moveable contact 134.

In one optional embodiment of the invention, the moveable contact 134 controls the gating of the thyristors Q1 and Q2 and provides a fuse switch closed signal 17 to AND gate A13. In other words, if a human lineman tries to open the fuse switch 100, the thyristors Q1 and Q2 are automatically ungated to prevent blowing the fuse 122. Similarly, if a human lineman tries to close the fuse switch 100 and a trigger signal is applied to A13, the moveable contact 134 prevents the thyristors Q1 and Q2 from conducting until the moveable contact 134 is in its fully closed position and supplying input to A13 (FIG. 1). In this embodiment, the moveable contact 134 must be latched in its closed position as a requirement for allowing the gating of the thyristors Q1 and Q2. One way of doing this is to provide a fiber optic light path (e.g. from triggering LEDs 18 and 20) only when the moveable contact 134 is in its closed position. One way of doing this is by providing a hole through the moveable contact 134 (or through a plate mounted to and moveable with the moveable contact 134) which lines up with a hole through the arm 108 (or through a plate mounted to and moveable with the arm 108). The holes through the contact 134 and arm 108 allows the passage of light between fiber optic leads. In operation, removal of the thyristor gating signal also causes the moveable contact 134 to move from its closed position to its open position by releasing the latch 142 and operating the moving means 140. The thyristors will not be able to be regated until the moveable contact 134 is back in its closed position and the arm 108 is in its closed position (when the fuse 122 is intact). Instead of providing a fiber optic path from LEDs 18 and 20 through the holes through the contact 134 and the arm 108, a fiber optic path can be provided which will be ANDed with the gating signals (output from Q4 and Q3) for gating the thyristors Q1 and Q2. Thus, the thyristors will not be gated unless contact 134 and arm 108 of the fuse-switch are in their closed positions.

Control of the gating of Q1 and Q2 can also be performed by a mechanical switch 25 (see FIG. 2) with contacts that are closed when moveable contact 134 is securely latched in the proper position for conducting current, and unlatched by hookstick, motor, or solenoid operation.

Up-Line Inrush Protection Circuit

Figure 11:
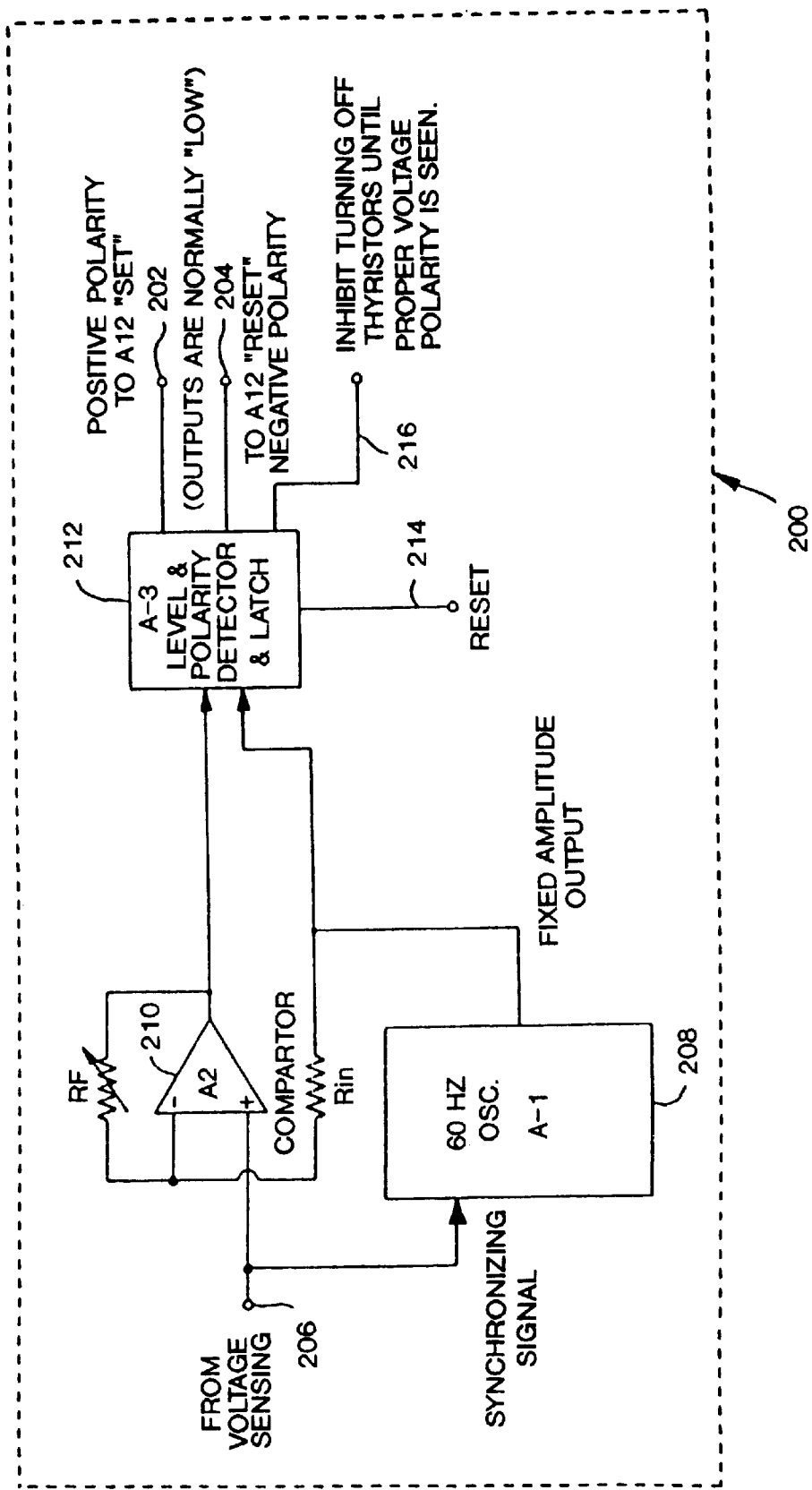
FIG. 11 is a circuit schematic for an up-line inrush prevention circuit.

Shown in FIG. 11 is an up-line inrush protection circuit 200 which is optionally used with the voltage polarity memory circuit 10 shown in FIG. 1. More particularly, the up-line inrush protection circuit 200 has outputs 202 and 204. If this alternative embodiment of the invention is employed, the set input S of the D type flip-flop A12 of FIG. 1 is connected to the output 202 instead of to ground, and the reset input R of the flip-flop A12 of FIG. 1 is connected to the output 204 instead of to ground.

The circuit 200 has a input 206 which is connected to the voltage sensor 12.

The circuit 200 includes a 60 Hz oscillator 208 which has an input connected to the voltage sensor 12, via the input 206, which is synchronized by the voltage sensed at input 206, and which outputs a sine-wave that has a constant RMS value.

The circuit 200 further includes an amplifying comparator including an op-amp 210 having a non-inverting input connected to the input 206, having an inverting input, and having an output. The circuit 200 further includes a feedback resistor Rf, which is a variable resistor, connected between the output of the op-amp 210 and the inverting input of the op-amp 210.

The circuit 200 further includes a resistor Rin connected between the output of the oscillator 208 and the non-inverting input of the op-amp 210.

The circuit 200 further includes a level polarity detector and latch 212 having an input connected to the output of the op-amp 210, having an input connected to the output of the oscillator, having a reset input 214, having the output 202, having the output 204, and having an output 216 that inhibits turning off of the thyristors Q1 and Q2 until a proper voltage polarity is seen.

The output of the oscillator is compared to the voltage sensed at the input 206 in the amplifying comparator that includes op-amp 210. When the amplitude of the voltage sensed at the input 206 is less than the output of the oscillator, then there is no response by the level and polarity detector 212. This is because the output of the op-amp 210 will be of a polarity opposite to the polarity of the output of the oscillator.

When the voltage sensed at input 206 has a greater amplitude than the output of the oscillator 208, then the level polarity detector has the same polarity as the polarity of the voltage sensed at input 206 and provides a high output at 202 if the polarity is positive, and a high output at 204 if the polarity is negative. Otherwise, the outputs 202 and 204 are normally low.

The output Q of the flip-flop A12 is positive when the voltage sensed at input 206 is positive and above a level established by the output of the oscillator 208. When the polarity of the voltage polarity sensed at 206 is negative and the amplitude of the voltage sensed at input 206 is greater in value than the amplitude of the output of the oscillator 208, then the level and polarity detector 212 has a high output at its output 204, which is applied to the reset input R of the flip-flop A12. This results in the output Q' of the flip-flop A12 going high. When source current is interrupted, a low going clock pulse at the clock input C of the flip-flop A12 latches the Q and Q' outputs of the flip-flop A12 to serve as the voltage polarity memory.

If the voltage sensed at input 206 drops below the reference value of the oscillator 208, then the outputs 202 and 204 of the level and polarity detector 212 are kept at the same value that they were prior to the voltage dropping. Thus, the circuit 200 senses and memorizes the polarity of the last half cycle that was above a predetermined value.

The resistor Rf is variable or selectable and its setting determines the level that defines the value that will determine the predominant polarity of the last half-cycle of voltage if the line voltage falls below that level.

The output 216 of the level and polarity detector 212 prevents removing the triggering of thyristors Q1 and Q2 until the voltage polarity is the same as stored in the flip-flop A12. This assures that when the thyristors Q1 and Q2 are shut off, the next half cycle of voltage will have the opposite polarity. This prevents up-line inrush currents. More particularly, when the thyristors Q1 and Q2 are turned off, the next half cycle of voltage on the source side 24 of the thyristors Q1 and Q2 will have a polarity opposite the polarity of the last half cycle sensed at input 206 that was above a predetermined value.

The reset input 214 on the level and polarity detector permits its outputs 202 and 204 to be unlatched.

Modifications may be made to the preferred embodiment described and illustrated herein without departing from the spirit of the invention as expressed in the following claims. For example, although each of the thyristors Q1 and Q2 are shown and described herein as single thyristors, in actual practice, series connected, parallel, or series-parallel thyristors may be required for each of Q1 and Q2 because of ratings limitations.

Various features and advantages of the invention are set forth in the following claims.

I claim:

1. An apparatus for use in a power distribution system, said apparatus comprising:

a first assembly including a first support having an electrically conductive portion, an arm pivotally mounted to said first support for movement between a closed position and an open position, said arm having a conductive portion which is adapted to be electrically connected to one of a power source and a load and which is spaced from said conductive portion of said first support both when said arm is in its closed position and when said arm is in its open position, said first assembly further comprising a spring biasing said arm to its open position, and a fuse electrically connected between said conductive portion of said arm and said conductive portion of said first support, said fuse retaining said arm in its closed position against the bias of said spring, and a second assembly including a second support having an electrically conductive portion adapted to be electrically connected to the other of a power source and a load, a moveable contact pivotally mounted to said second support for movement between a closed position, an open position, and an intermediate position, said moveable contact having a conductive portion which is electrically connected to said second support when said moveable contact is in its open position, its closed position, and its intermediate position, said conductive portion of said moveable contact being electrically isolated from said conductive portion of said first support and electrically isolated from said conductive portion of said arm when said moveable contact is in its open position, and said conductive portion of said moveable contact being in electrical contact with both said conductive portion of said arm and said conductive portion of said first support when said moveable contact is in said intermediate position.

2. An apparatus in accordance with claim 1 and further comprising anti-parallel thyristors connected to said conductive portion of said arm.

3. An apparatus in accordance with claim 1 and further comprising anti-parallel thyristors connected to said conductive portion of said second support.

4. An apparatus in accordance with claim 1 wherein said fuse is an expulsion type fuse.

5. An apparatus in accordance with claim 1 wherein said second assembly further comprises a motor for moving said moveable contact between its open and closed positions.

6. An apparatus in accordance with claim 1 wherein said second assembly further comprises a solenoid for moving said moveable contact between its open and closed positions.

7. An apparatus in accordance with claim 2 and further comprising a fiber optic cable, means responsive to a fiber optic signal transmitted via said fiber optic cable for gating said anti-parallel thyristors, and means for providing a fiber optic light signal to said fiber optic cable only when said moveable contact is in its closed position.

8. An apparatus in accordance with claim 2 and further comprising a mechanical switch which when closed permits gating of said anti-parallel thyristors, which is mechanically connected to said moveable contact, and which is closed only when said moveable contact is in its closed position.

9. An apparatus in accordance with claim 1 wherein said fuse allows current to flow through said fuse when said moveable contact is in its intermediate position if current is available at said conductive portion of said arm when said moveable contact is in its intermediate position, and whereby when current flow causes said fuse to blow, said spring biases said arm to its open position thereby providing a visual indication that there is no current path from the source to the load.

* * * * *